United States Patent
Randall

(10) Patent No.: US 7,482,578 B2
(45) Date of Patent: Jan. 27, 2009

(54) GAMMA RADIATION SPECTRAL LOGGING SYSTEM AND METHOD FOR PROCESSING GAMMA RADIATION SPECTRA

(75) Inventor: Russel R. Randall, West Richland, WA (US)

(73) Assignee: Lonkar Services, Ltd. (CA)

( * ) Notice: Subject to any disclaimer, the term of this patent is extended or adjusted under 35 U.S.C. 154(b) by 253 days.

(21) Appl. No.: 11/451,063

(22) Filed: Jun. 12, 2006

(65) Prior Publication Data

US 2007/0284518 A1    Dec. 13, 2007

(51) Int. Cl.
*G01V 5/04* (2006.01)
(52) U.S. Cl. ..................................... 250/261
(58) Field of Classification Search ............... 250/261, 250/262
See application file for complete search history.

(56) References Cited

U.S. PATENT DOCUMENTS

| | | | |
|---|---|---|---|
| 4,220,851 A | | 9/1980 | Whatley, Jr. |
| 4,346,590 A | | 8/1982 | Brown |
| 4,433,240 A | * | 2/1984 | Seeman ............... 250/256 |
| 4,730,263 A | | 3/1988 | Mathis |
| 5,196,698 A | * | 3/1993 | Schneider ............ 250/262 |
| 5,272,336 A | | 12/1993 | Moake |
| 5,461,230 A | | 10/1995 | Winemiller |
| 5,608,214 A | | 3/1997 | Baron et al. |
| 5,744,804 A | * | 4/1998 | Meijer et al. ......... 250/369 |
| 6,051,830 A | | 4/2000 | Moake |
| 6,289,283 B1 | * | 9/2001 | Plasek ..................... 702/8 |
| 6,389,367 B1 | | 5/2002 | Plasek |
| 6,554,065 B2 | | 4/2003 | Fisher et al. |
| 6,781,115 B2 | | 8/2004 | Stoller et al. |
| 2003/0138067 A1 | | 7/2003 | Tiller et al. |
| 2005/0199794 A1 | | 9/2005 | Mickael |

FOREIGN PATENT DOCUMENTS

| | | |
|---|---|---|
| CA | 2183123 | 10/2000 |
| EP | 0 387 055 A2 | 9/1990 |

OTHER PUBLICATIONS

Qualheim, Bern and Hill, Donald G., "Modified Scintillation Detectors to Improve Slim-Hole Gamma Ray Log Repeatability in Low Radioactivity Materials", presented at the Environmental Restoration '95 Conference held in Denver, Colorado, dated Aug. 1995.

* cited by examiner

*Primary Examiner*—Constantine Hannaher
(74) *Attorney, Agent, or Firm*—Rodman & Rodman; Terrence N. Kuharchuk

(57) ABSTRACT

A gamma ray logging system and a method of calibrating a detected gamma radiation spectrum. The gamma ray logging system includes a gamma ray detector for detecting gamma radiation, an analyzer for generating a detected gamma radiation spectrum from the detected gamma radiation, and a processor which is configured to perform a calibration of the detected gamma radiation spectrum. The method of calibrating the detected gamma radiation spectrum includes selecting at least two data points from the detected gamma radiation spectrum, determining a mathematical relationship from the selected data points, and using the mathematical relationship to generate a calibrated gamma radiation spectrum from the detected gamma radiation spectrum.

41 Claims, 6 Drawing Sheets

GAMMA RADIATION SPECTRAL LOGGING SYSTEM AND METHOD FOR PROCESSING GAMMA RADIATION SPECTRA

TECHNICAL FIELD

A gamma radiation spectral logging system and a method for processing gamma radiation spectra.

BACKGROUND OF THE INVENTION

Gamma radiation is a high energy form of electromagnetic radiation which is produced by nuclear transitions of radioactive materials. The energy level of gamma radiation typically ranges between about 100 keV and about 3000 keV.

In the context of oil and gas applications, gamma radiation may be produced by "naturally occurring" sources in a subterranean formation, such as potassium (K), uranium (U) and thorium (Th), collectively referred to as KUT or background sources. The presence of naturally occurring sources of gamma radiation may be indicative of a particular type of geological formation. For example, shales often contain naturally occurring sources of gamma radiation. Since shales also often contain petroleum deposits, the identification of naturally occurring radiation in formations may assist in locating these petroleum deposits.

Alternatively, gamma radiation may be produced by radioactive materials which are introduced into a borehole or subterranean formation. The introduction of radioactive materials into a borehole or subterranean formation may facilitate a determination, by measuring the gamma radiation, of parameters relating to the borehole or subterranean formation, including the presence and/or location of fractures and the permeability of such fractures.

Gamma ray logging therefore involves the measurement of gamma radiation produced by either naturally occurring or introduced radioactive materials.

Gamma ray logging may be performed for the purpose of determining the total amount of gamma radiation which is present at one or more locations, zones or intervals of interest in a borehole, throughout all or a portion of the typical energy level range of gamma radiation. This type of gamma ray logging is often referred to as total gamma ray logging or total count gamma ray logging. Total count gamma ray logging may be used to determine the total amount of gamma radiation which is present at a particular location, zone or interval, but does not distinguish the gamma radiation on the basis of its various energy levels. Total count gamma ray logging is often performed during the drilling of boreholes by using "logging-while-drilling" systems.

Alternatively, gamma ray logging may be performed for the purpose of determining the amounts of gamma radiation which are produced at different energy levels throughout all or a portion of the typical energy level range of gamma radiation. This type of gamma ray logging is often referred to as spectral gamma ray logging, since a spectrum of gamma radiation as a function of energy level results from the logged data. Spectral gamma ray logging can be used to determine the total amount of gamma radiation which is present at a particular location, zone or interval, but may also be used to provide a breakdown of the amounts of gamma radiation that are present at different energy levels. This breakdown of the amounts of gamma radiation at different energy levels can provide useful information about the radioactive material or materials which are producing the gamma radiation. Spectral gamma ray logging is often used in conjunction with well evaluation or fracturing operations, where one or more radioactive materials may be injected into a well as tracers. Spectral gamma ray logging may also be used during the drilling of boreholes in order to obtain information about the amounts of naturally occurring radioactive materials which may be present in the borehole.

Every radioactive material exhibits a spectral signature, which is a gamma radiation spectrum of produced gamma radiation that is dependent upon the material and upon the environmental conditions. The spectral signatures of radioactive materials may be used to identify the radioactive materials that are the sources of gamma radiation which may be present at a particular, location, zone or interval. The amplitudes or magnitudes of the spectral signatures can be used to determine the amounts of the sources which are producing the gamma radiation.

Gamma radiation may be measured using a gamma ray detector. One common form of gamma ray detector is comprised of a scintillator and a photomultiplier. The scintillator receives gamma radiation and emits photons in response thereto. The number of photons which is emitted by the scintillator is proportional to the energy level of the gamma radiation received by the scintillator. The photomultiplier converts the photons into an electrical pulse which is proportional to the number of photons emitted by the scintillator and which is dependent upon the "high voltage" which is supplied to the photomultiplier.

The magnitude of the high voltage which is supplied to the photomultiplier establishes the "gain" of the gamma ray detector. The high voltage is typically adjustable in order to adjust the gain of the gamma ray detector.

Unfortunately, the gain of a gamma ray detector will typically fluctuate even if the high voltage remains fixed. Most significantly, changes in the temperature of the gamma ray detector will cause the gain to fluctuate.

The gain of the gamma ray detector defines the magnitude of the electrical pulse which is generated by the photomultiplier in response to the emission of photons by the scintillator. The magnitude of the electrical pulse which is generated by the photomultiplier is used to define the energy level of the gamma radiation which is received by the scintillator. Consequently, fluctuations in the gain of the gamma ray detector result in fluctuations in the apparent energy level or levels of the gamma radiation detected by the gamma ray detector.

The prior art describes systems and methods for compensating for the effects of change of temperature of a gamma ray detector. Many of these systems and methods provide for "gain stabilization", which involves adjusting the gain of the gamma ray detector during data acquisition to compensate for the effects of temperature on the gamma ray detector. At least one system and method provides for a temperature correction of data acquired by the gamma ray detector.

European Patent Application No. 0 387 055 A2 (Gadeken et al) describes a spectral gamma ray logging method for obtaining relative distance indications of one or more radioactive tracers with respect to a wellbore. The method involves separating gamma radiation spectra into component parts attributable to each radioactive tracer and obtaining the relative distance indications for the radioactive tracers from the component parts of the gamma radiation spectra.

U.S. Pat. No. 4,220,851 (Whatley) describes a gain stabilization system which includes a light emitting diode positioned between the scintillator and the photomultiplier of a gamma ray detector, which light emitting diode emits stabilizing light pulses which are used to provide gain stabilization of the gamma ray detector.

U.S. Pat. No. 4,346,590 (Brown) describes an improved gain stabilization system of the type described in the Whatley patent which includes means for maintaining the intensity of the light pulses which are emitted by the light emitting diode regardless of temperature change.

U.S. Pat. No. 5,272,336 (Moake) describes a method for applying a temperature correction to radiation measurements made by a gamma ray detector, which method involves measuring the temperature when and where radiation measurements are taken and applying one or more temperature correction formulae to the measurements.

U.S. Pat. No. 5,461,230 (Winemiller) describes a method and apparatus for providing temperature compensation in gamma ray detectors which involves initially calibrating a gamma ray detector by placing a reference source of radiation in close proximity to the gamma ray detector and monitoring variations in the output signals from the gamma ray detector resulting from the reference source as a function of temperature. Once the initial calibration has been performed, a temperature compensation circuit uses a temperature sensor to vary the magnitude of a threshold voltage as a function of the operating temperature of the gamma ray detector in accordance with the initial calibration, wherein the threshold voltage corresponds to the gain of the gamma ray detector.

U.S. Pat. No. 6,051,830 (Moake) describes a method for calibrating a logging tool which includes providing a stabilization source which emits a stabilization signal having a known energy, receiving a total spectrum which includes the stabilization signal, discerning the stabilization signal in the total spectrum, and adjusting the gain of the logging tool on the basis of the discerned stabilization signal.

U.S. Pat. No. 6,554,065 (Fisher et al) describes a self-contained gamma radiation logging tool which includes a memory for storing data pertaining to detected nuclear energy.

U.S. Pat. No. 6,781,115 (Stoller et al) describes a system and method for detecting radiation in an area surrounding a wellbore, wherein the system provides azimuthally focused detector sensitivity.

U.S. Patent Application Publication No. US 2003/0138067 A1 describes apparatus and methods for measuring radiation in a borehole environment using a $YAlO_3$:Ce (YAP) scintillation crystal.

U.S. Patent Application Publication No. US 2005/0199794 A1 describes a spectral gamma ray logging-while-drilling system and method for determining concentrations of naturally occurring radioactive materials in earth formations. The system and method provide automatic gain control for the gamma ray detector using two different methods of gain stabilization. A first method of gain stabilization involves developing a relationship between measured slope of a gamma ray spectrum in the Compton region as a function of the high voltage supplied to the gamma ray detector required to maintain a standard detector gain, and then using the slope to obtain a voltage adjustment as a first order gain correction which is required to maintain the standard detector gain. Once the voltage adjustment has been applied to the gamma ray detector for data acquisition, second and third order gain corrections are applied which involve adjusting the widths of energy channels and redistributing measured count rates so that ultimately, all identifiable peaks fall within standard energy channels. A second method of gain stabilization involves positioning a small radioactive source near the gamma ray detector so that the source generates a calibration peak in the measured gamma ray spectrum. The gain of the gamma ray detector is then adjusted throughout use of the system so that the calibration peak remains a constant energy level.

Finally, U.S. Pat. No. 5,608,214 (Baron et al) describes a gamma ray spectral tool and method which includes a self-adjusting gain stabilization feature and which is operable in a log/calibration mode and a latched mode. The gain stabilization feature is operative only when the tool is in the log/calibration mode. In the log/calibration mode, a voltage to a photomultiplier tube is dynamically adjusted to compensate for output shifts of the photomultiplier tube as indicated by 60 keV gamma rays from an americium source. In the latched mode, the voltage to the photomultiplier tube is held constant. When the output of the spectral tool indicates an overall quantity of gamma rays exceeding a predetermined value, the spectral tool is switched from the log/calibration mode to the latched mode.

There remains a need for a gamma ray logging system which facilitates calibration of detected gamma ray spectra and which does not require gain stabilization of the gamma ray detector during data acquisition. There also remains a need for a method of calibrating a detected gamma ray gamma radiation spectrum which is dependent only upon the detected gamma ray spectra.

SUMMARY OF THE INVENTION

The present invention is comprised of a gamma ray spectral logging system including a gamma ray detector, which system can acquire one or more detected gamma ray spectra, can calibrate the detected gamma ray spectra after they are acquired, and does not require gain stabilization of the system during data acquisition.

The present invention is also comprised of a method of calibrating one or more detected gamma ray spectra, which method utilizes the detected gamma ray spectra in order to perform the calibration and does not require the use of reference sources of gamma radiation.

The system is comprised of a gamma ray detector which is capable of detecting gamma radiation and which is capable of distinguishing the energy levels of the gamma radiation being detected. The system is also comprised of an analyzer for sorting the detected gamma radiation into channels according to the energy levels of the detected gamma radiation, thereby generating one or more detected gamma radiation spectra, wherein the detected gamma radiation spectra provide an indication of the amounts of detected gamma radiation as a function of the channels.

The method is comprised of processing a detected gamma radiation spectrum in order to generate a calibrated gamma radiation spectrum, wherein the calibrated gamma radiation spectrum provides a fit of the detected energy levels of the detected gamma radiation to the actual energy levels of the detected gamma radiation.

The fit is comprised of a mathematical relationship between the actual energy levels and the detected energy levels. Preferably the fit is provided using known actual energy levels. Preferably the known actual energy levels relate to peaks present and/or observed in the detected gamma radiation spectrum.

The mathematical relationship may be comprised of any equation or equations which will define the actual energy levels as a function of the detected energy levels. For example, the mathematical relationship may be comprised of a linear relationship or a polynomial relationship. The polynomial relationship may be of any order. In certain exemplary embodiments the mathematical relationship is a linear relationship.

The nature of the mathematical relationship is dependent upon the correlation between the actual energy levels and the detected energy levels. The nature of the correlation between the actual energy levels and the detected energy levels is dependent upon the characteristics of the gamma ray detector, the analyzer and/or any other associated electronic components of the logging system.

The mathematical relationship may be determined using any suitable curve fitting technique or techniques. For example, the mathematical relationship may be determined using a least squares method or a cubic spline method.

In one system aspect, the invention is a gamma ray logging system comprising:

(a) a gamma ray detector for detecting gamma radiation at a plurality of actual energy levels and for generating detector output signals each representing a detected count of gamma radiation, wherein each of the detector output signals has a parameter value which is dependent upon the actual energy level of its associated detected count of gamma radiation;

(b) an analyzer for sorting the detector output signals into a plurality of channels according to their parameter values in order to generate a detected gamma radiation spectrum, wherein the detected gamma radiation spectrum provides an indication of a frequency of the parameter values as a function of the parameter values; and (c) a processor which is configured to perform a calibration of the detected gamma radiation spectrum.

In one method aspect, the invention is a method of calibrating a detected gamma radiation spectrum generated from a plurality of detector output signals generated by a gamma ray detector, wherein each of the detector output signals represents a detected count of gamma radiation, wherein each of the detector output signals has a parameter value which is dependent upon the actual energy level of its associated detected count of gamma radiation, wherein the detector output signals are sorted into a plurality of channels according to their parameter values to generate the detected gamma radiation spectrum, and wherein the detected gamma radiation spectrum provides an indication of a frequency of the parameter values as a function of the parameter values, the method comprising:

(a) selecting at least two data points from the detected gamma radiation spectrum, wherein each of the selected data points is comprised of a known actual energy level and its associated parameter value;

(b) determining a mathematical relationship for the selected data points; and (c) adjusting the parameter values in the detected gamma radiation spectrum in accordance with the mathematical relationship, thereby generating a calibrated gamma radiation spectrum comprising adjusted parameter values.

Preferably the processor of the system of the invention is configured to perform the calibration of the detected gamma radiation spectrum according to the method of the invention.

The system and method of the invention may be used for gathering gamma ray data (i.e., gamma ray logging) in any application. The gamma ray logging may include the generation of a single detected gamma radiation spectrum or may include the generation of a plurality of detected gamma radiation spectra. Preferably the gamma ray logging includes the generation of a plurality of detected gamma radiation spectra.

The system and method of the invention may be used for detecting gamma radiation from introduced gamma radiation sources and/or from naturally occurring gamma radiation sources.

Preferably the system and method of the invention are used for logging boreholes such as wellbores. Boreholes may be logged using the invention while they are being drilled. Alternatively, existing boreholes such as wellbores may be logged using the invention after they are drilled. For example, existing wellbores may be logged using the invention in connection with wellbore evaluation or fracturing operations.

When the invention is used for logging boreholes, the logging typically comprises generating a plurality of detected gamma radiation spectra representing gamma radiation which is received over a depth interval of the borehole.

When the invention is used for logging boreholes, the data acquisition by the gamma ray detector and the generation of detector output signals is performed within the borehole. As a result, for such applications the gamma ray detector is adapted to be lowered into the borehole.

When the invention is used for logging boreholes, the analyzer may be adapted to be lowered into the borehole or the analyzer may be adapted to be located exterior of the borehole. Preferably the analyzer is adapted to be lowered into the borehole so that the detected gamma radiation spectrum or spectra are generated in the borehole.

The gamma ray detector and the analyzer may be adapted to be lowered into the borehole in any suitable manner. For example, the gamma ray detector may be adapted to be lowered into the borehole on a pipe string such as jointed pipe or coiled tubing, or the gamma ray detector may be adapted to be lowered into the borehole on a wireline or slickline.

The system may be further comprised of a memory device for storing detector output signals and/or one or more detected gamma ray spectra. The memory device may also store other data which may be acquired by the system or by tools or sensors associated with the system.

Where the gamma ray detector and the analyzer are adapted to be lowered into the borehole in a manner which does not facilitate communication along the borehole, the system is comprised of the memory device and the memory device is adapted to be lowered into the borehole with the gamma ray detector and preferably the analyzer.

In a preferred embodiment the gamma ray detector, the analyzer and the memory device are adapted to be lowered into the borehole on a slickline.

The system may be further comprised of a temperature sensor for sensing a temperature of the gamma ray detector. The temperature sensor may be configured to provide a temperature indication when detector output signals are being generated. The temperature sensor may be associated with the memory device so that the temperature indications are stored in the memory device. The temperature indications may be used to determine the temperature of the gamma ray detector when the detector output signals are being generated.

In a preferred embodiment the processor performs the method of the invention.

The processor may be connected with the gamma ray detector, the analyzer, and/or the memory device. Alternatively, the processor may be separate from the other components of the system.

In a preferred embodiment, the processor is separate from the gamma ray detector, the analyzer and the memory device and is adapted to be located outside of the borehole, but the processor is adapted to be connected with the memory device so that detected gamma radiation spectra, detector output signals, and/or other data stored in the memory device can be downloaded from the memory device and processed by the processor. As a result, in a preferred embodiment the method of the invention is performed entirely or substantially outside of the borehole using data acquired within the borehole.

The parameter values of the detector output signals are directly or indirectly comprised of the detected energy levels of the detected gamma radiation. For example, the parameter values may each be comprised of the detected energy levels of the detector output signals as defined by the gain of the gamma ray detector or may be comprised of the channels which are allocated by the analyzer to represent the energy levels of the gamma radiation.

Preferably, the gamma radiation is detected from at least one known gamma radiation source. The known gamma radiation source or sources may be naturally occurring radioactive materials or may be introduced radioactive materials which are being used as radioactive tracers.

Preferably each of the known gamma radiation sources contributes a spectral signature to the detected gamma radiation spectrum. Preferably the spectral signatures of each of the known gamma radiation sources are comprised of at least one peak. Preferably, each of the selected data points is defined by a selected peak from the spectral signatures of the known gamma radiation sources.

The selected data points which are used in the method of the invention are therefore preferably comprised of a known actual energy level of a selected peak and a parameter value which is associated with the selected peak. A mathematical relationship is determined using the selected data points by fitting a suitable curve to the selected data points. In certain exemplary embodiments, the mathematical relationship is a linear relationship, but the nature of the mathematical relationship in the practice of the invention will be dependent upon the detected energy levels obtained from the gamma ray detector and their correlation with the known actual energy levels.

The mathematical relationship may be used to adjust the parameter values in the detected gamma radiation spectrum in order to generate a calibrated gamma radiation spectrum comprising adjusted parameter values. The calibrated gamma radiation spectrum provides a calibrated correlation between detected energy levels which are depicted in the detected gamma radiation spectrum by the parameter values and actual energy levels which are represented in the calibrated gamma radiation spectrum by the adjusted parameter values. The calibrated gamma radiation spectrum ensures that the derived mathematical relationship exists between the adjusted parameter values and the actual energy levels.

The adjusted parameter values may be directly or indirectly representative of the actual energy levels of the detected gamma radiation. For example, the adjusted parameter values may each represent the actual energy levels of the detector output signals or may be comprised of the channels which are allocated by the analyzer to represent the energy levels of the gamma radiation.

In certain exemplary embodiments the mathematical relationship is a linear relationship. Preferably the linear relationship is an equation of the following general form:

$$\text{Actual Energy Level} = a(\text{Adjusted Parameter Value}) + b \quad (1)$$

where "a" and "b" are calibration coefficients for the detected gamma radiation spectrum, with "a" being a slope coefficient and "b" being an intercept coefficient.

The parameter values which are included in the selected data points may be comprised of any values obtained from the detected gamma radiation spectrum which are representative of the detected energy levels. For example, the parameter values may be comprised of the mean, median or mode of the selected peaks which define the selected data points.

Preferably the parameter values are comprised of the centroids of the selected peaks.

Preferably the selected peaks are refined before the parameter values are obtained therefrom. The selected peaks may be refined in any manner which may increase the statistical accuracy of the parameter values.

For example, in a preferred embodiment each of the selected peaks is refined by being fitted to a Gaussian curve. In a preferred embodiment, the parameter values are preferably comprised of the centroids of the Gaussian curves.

Once the calibrated gamma radiation spectrum has been generated by adjusting the parameter values in accordance with the mathematical relationship, the calibrated gamma radiation spectrum may be inspected to confirm whether it provides an acceptable level of correlation with some or all of the known actual energy levels. If the calibrated gamma radiation spectrum does not provide an acceptable level of correlation with the known actual energy levels, the calibration may be repeated to determine a new mathematical relationship and to generate a further calibrated gamma radiation spectrum. In a preferred embodiment, the acceptable level of correlation between the adjusted parameter values and the known actual energy levels is preferably within about +/−5 percent, or more preferably within about +/−2 percent of the known actual energy levels.

Once the calibrated gamma radiation spectrum provides an acceptable level of correlation with the known actual energy levels, the calibrated gamma radiation spectrum may be processed in order to obtain information about the source or sources of the detected gamma radiation.

The gamma radiation may be detected from a plurality of gamma radiation sources, with the result that the detected gamma radiation spectrum and thus the calibrated gamma radiation spectrum may include contributions from one or more gamma radiation sources.

The gamma radiation sources may be comprised of naturally occurring gamma radiation sources, introduced gamma radiation sources, or combinations thereof. Each of these gamma radiation sources makes a contribution to the detected gamma radiation spectrum and to the calibrated gamma radiation spectrum. The contributions may be comprised of the spectral signatures of the gamma radiation sources.

The method may therefore be further comprised of isolating the contribution of a gamma radiation source of interest in order to facilitate quantifying the gamma radiation source of interest.

The method may be further comprised of quantifying a gamma radiation source of interest which is contributing to the calibrated gamma radiation spectrum. Quantifying the gamma radiation source of interest may be comprised of deducting from the calibrated gamma radiation spectrum the contributions of the gamma radiation sources which are contributing significantly to the calibrated gamma radiation spectrum, other than the gamma radiation source of interest.

Where the gamma radiation sources are comprised of both naturally occurring gamma radiation sources and introduced gamma radiation sources and the gamma radiation source of interest is an introduced gamma radiation source, the naturally occurring gamma radiation sources may typically not contribute significantly to the calibrated gamma radiation spectrum in comparison with the contributions from the introduced gamma radiation sources.

As a result, quantifying the gamma radiation source of interest may be comprised of deducting from the calibrated gamma radiation spectrum the contributions to the calibrated gamma radiation spectrum of the introduced gamma radiation sources.

Where the naturally occurring gamma radiation sources do contribute significantly to the calibrated gamma radiation spectrum, quantifying the gamma radiation source of interest may be further comprised of deducting from the calibrated gamma radiation spectrum the contribution to the calibrated gamma radiation spectrum of one or more of the naturally occurring gamma radiation sources.

The contributions of the gamma radiation sources may be deducted from the calibrated gamma radiation spectrum in any manner. For example, the contributions of the gamma radiation sources may be separated and/or deducted from the calibrated gamma radiation spectrum by deconvolving the calibrated gamma radiation spectrum.

The calibrated gamma radiation spectrum may be deconvolved by deriving mathematical functions which define the spectral signatures of each of the gamma radiation sources which are to be separated and/or deducted from the calibrated gamma radiation spectrum. Alternatively, selected portions of the calibrated gamma radiation spectrum may effectively be deconvolved by establishing stripping coefficients which define the contributions of the gamma radiation sources at these selected portions.

The selected portions of the calibrated gamma radiation spectrum may be comprised of energy windows of interest, which are segments of the calibrated gamma radiation spectrum which may span several energy levels or channels and which assist in identifying the gamma radiation sources. For example, the energy windows of interest may comprise peaks, valleys, or other identifying characteristics. The peaks may comprise the selected peaks which are used in the calibration of the detected gamma radiation spectrum.

In a preferred embodiment, the contributions to the calibrated gamma radiation spectrum of those gamma radiation sources which contribute significantly to the calibrated gamma radiation spectrum, such as introduced gamma radiation sources, are deducted by generating mathematical relationships which describe the spectral signatures of the gamma radiation sources at energy windows of interest in the calibrated gamma radiation spectrum and then determining stripping coefficients which define the contributions of the gamma radiation sources and which can be applied to the energy windows of interest.

In a preferred embodiment, the contributions to the calibrated gamma radiation spectrum of naturally occurring gamma radiation sources, which may contribute less significantly to the calibrated gamma radiation spectrum, may be deducted in any suitable manner. For example, the contributions may be deducted by processing the calibrated gamma radiation spectrum to derive mathematical functions which define the spectral signatures of the gamma radiation sources or to determine stripping coefficients for energy windows of interest in the calibrated gamma radiation spectrum, or may be deducted by applying arbitrary deductions to the energy windows of interest or by applying constant deductions to the energy windows of interest based upon historical data.

In a modified form of the method, the method may be further comprised of determining a first mathematical relationship for a first detected gamma radiation spectrum generated from detector output signals generated while the gamma ray detector was at a first temperature, determining a second mathematical relationship for a second detected gamma radiation spectrum generated from detector output signals generated while the gamma ray detector was at a second temperature, and determining a calibration/temperature relationship between the first mathematical relationship, the first temperature, the second mathematical relationship and the second temperature.

The modified form of the method may be further comprised of using the calibration/temperature relationship to derive a third mathematical relationship for a third detected gamma radiation spectrum generated from detector output signals generated while the gamma ray detector was at a third temperature.

The modified form of the method may be further comprised of determining the first temperature, the second temperature and the third temperature. The temperatures may be determined using a temperature sensor.

BRIEF DESCRIPTION OF DRAWINGS

Embodiments of the invention will now be described with reference to the accompanying drawings, in which.

DETAILED DESCRIPTION

Figure 1:
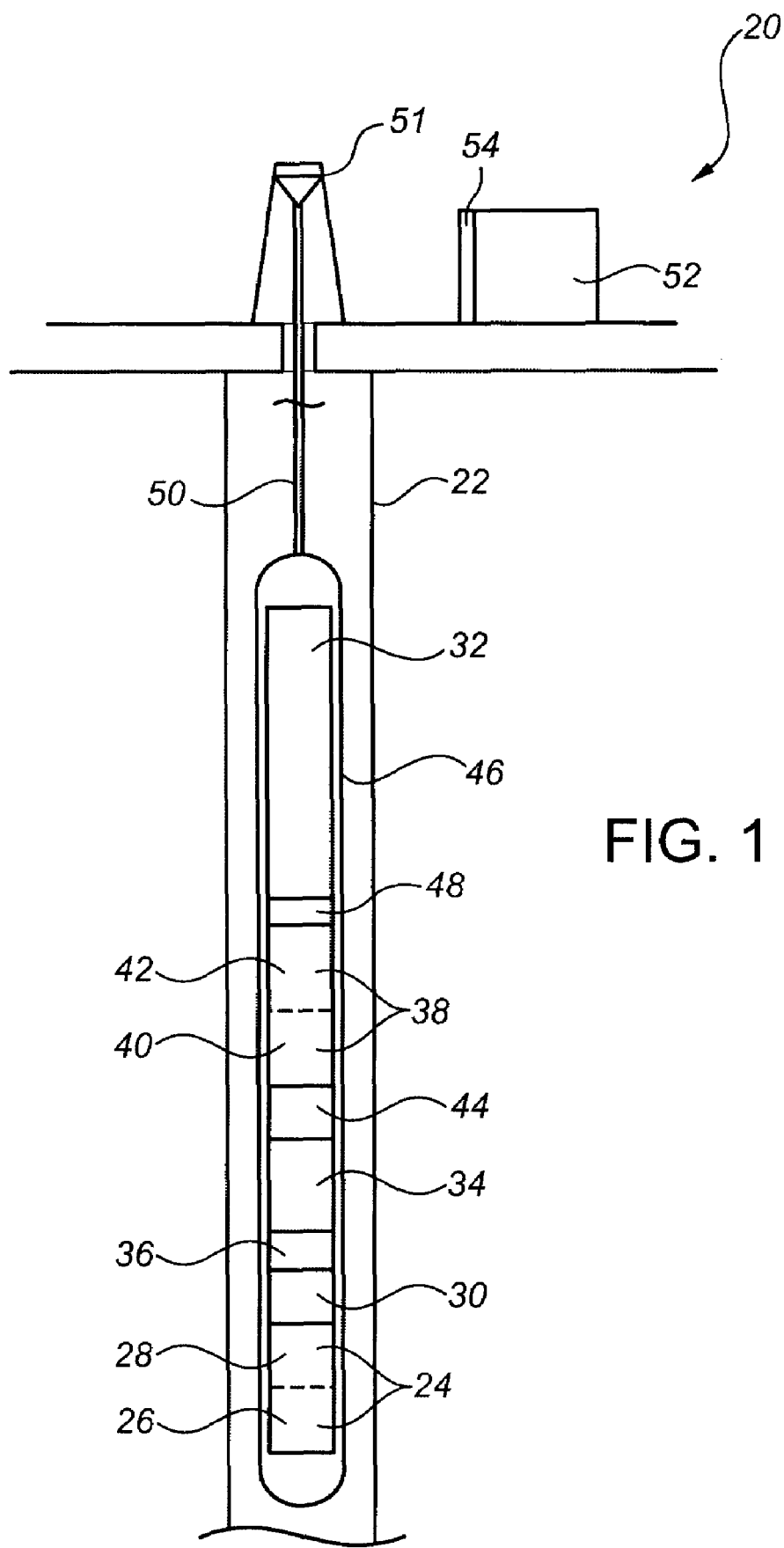
FIG. 1 is a block diagram illustrating the components of a preferred embodiment of a gamma ray logging system of the present invention.
Figure 2:
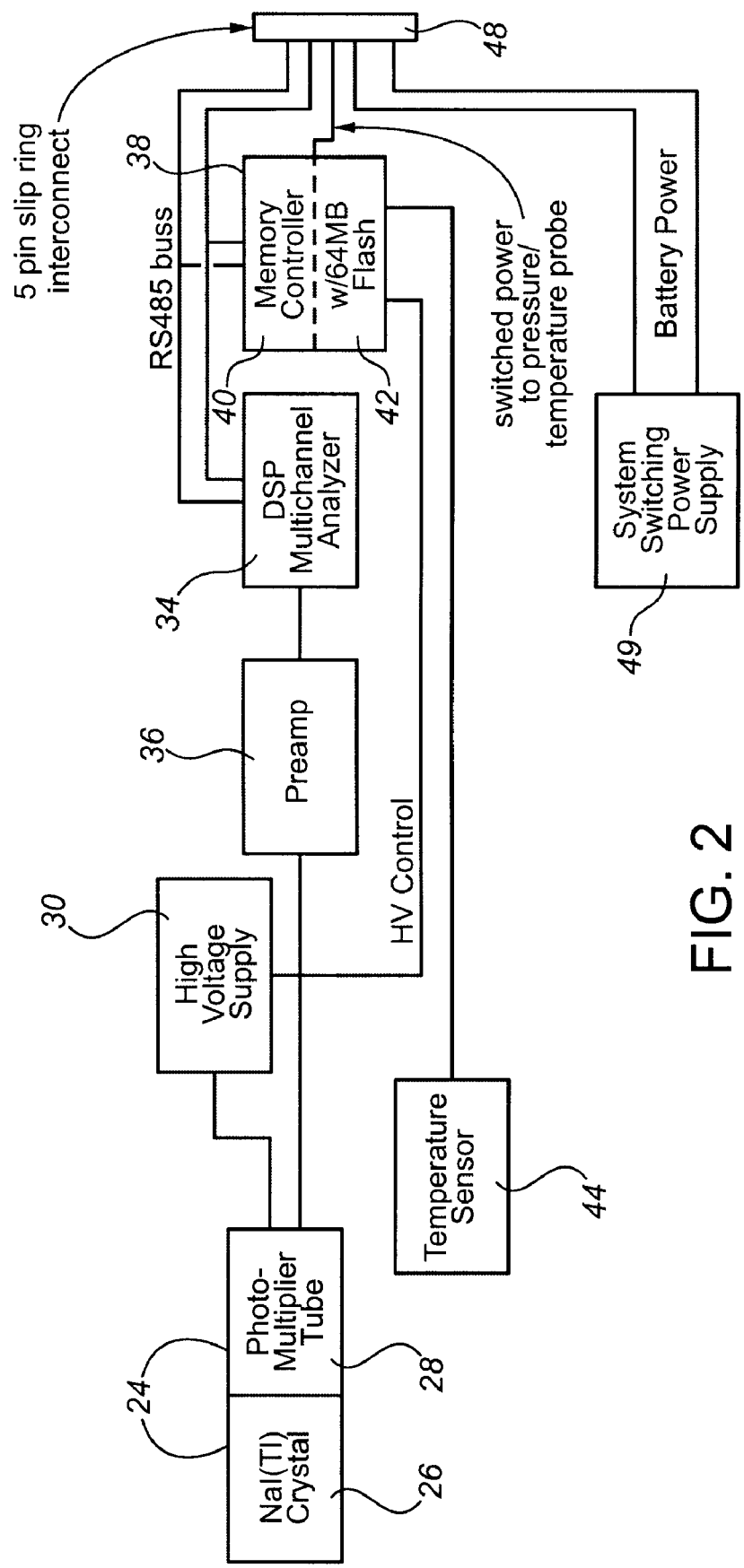
FIG. 2 is a block diagram illustrating the functional interconnection of the components of the gamma ray logging system shown in FIG. 1.

Referring to FIGS. 1 and 2, the present invention is directed at a gamma ray logging system (20), preferably a gamma ray spectral logging system. In the preferred embodiment, the system (20) generates and logs gamma radiation spectra as a function of depth as the system (20) is passed or run through a desired borehole (22).

In a preferred application of the system (20), the system (20) is utilized to evaluate fracture formation and characteristics of a selected underground formation, such an underground formation including a hydrocarbon producing zone. For instance, it is known that the production rate of a hydrocarbon producing zone may be enhanced by fracturing the formation. Specifically, the zone of interest is typically hydraulically fractured and propped open with clean sand. If desired, one or more relatively short lived radioactive tracer materials or isotopes may be mixed with the fracture fluid or sand during the fracturing process and injected into the formation. Utilizing the system (20) and method of the present invention, the presence of the radioactive tracer materials in the borehole (22) may be detected and logged, thus permitting an evaluation of the fracture formation and characteristics of the zone of interest and a subsequent enhancement or refinement of the fracture process.

More particularly, as discussed above, every radioactive material exhibits a spectral signature, which is a gamma radiation spectrum of produced gamma radiation that is dependent, at least in part, upon the radioactive material. Thus, the spectral signatures of the radioactive materials may be used to identify the radioactive materials that are the source of the gamma radiation. Accordingly, the system (20) may be used to detect the presence of a particular radioactive material, such as a radioactive tracer or isotope, at any particular location, zone or interval in the borehole (22). Further, the amplitudes or magnitudes of the spectral signatures may be used to determine the amounts of the radioactive materials present.

As a result, the spectral information provided and logged by the system (20) may be used to determine desired data concerning the formation such as the depth intervals having a fracture, the width of the fracture and the relative depth of penetration of the radioactive material through the formation. This data may then be utilized to enhance or refine the fracture process.

The gamma ray logging system (20) is preferably comprised of a gamma ray detector (24). The gamma ray detector (24) is preferably adapted or configured to detect gamma radiation at a plurality of actual energy levels and to generate detector output signals each representing a detected count of gamma radiation. Thus, each of the detector output signals has a parameter value which is dependent upon the actual energy level of its associated detected count of gamma radiation.

Any known or conventional gamma ray detector (24) may be utilized which is capable of detecting the gamma radiation and generating the detector output signals. However, in the preferred embodiment, the gamma ray detector (24) is comprised of a scintillator (26) and a compatible light sensing device, preferably a photomultiplier tube (28), which may also be referred to simply as a photomultiplier.

The scintillator (26) is preferably comprised of a crystal which scintillates or emits photons when contacted or struck by gamma radiation. Although any suitable scintillating crystal may be used, preferably the scintillator (26) is comprised of a sodium iodide (NaI) crystal. NaI crystals have been found to be relatively low in cost, while having relatively high temperature tolerance characteristics as compared with other scintillating crystals.

Thus, the crystal of the scintillator (26) receives or detects the gamma radiation at a plurality of actual energy levels and emits photons in response to the detected gamma rays. The number of photons emitted by the crystal of the scintillator (26) is proportional to the actual energy level of the gamma rays detected or received by the crystal. The energy level of the gamma rays is typically measured in electron volts.

Further, the scintillator (26) is preferably optically coupled with the photomultiplier tube (28) such that the photons emitted by the scintillator (26) are received by or collide with the photomultiplier tube (28) in order to emit or generate an electrical pulse therefrom comprising the detector output signal. In other words, the photomultiplier tube (28) converts the photons into an electrical pulse to generate the detector output signal which is proportional to the number of photons emitted by the crystal of the scintillator (26). Thus, each detector output signal represents a detected count of gamma radiation. Further, each of the detector output signals has a parameter value which is dependent upon the actual energy level of its associated detected count of gamma radiation. For instance, the amplitude of the detector output signal is proportional to the actual energy level of its associated detected count of gamma radiation.

In addition, the photomultiplier tube (28) is preferably associated with a voltage supply, referred to as a high voltage supply (30). The detector output signals are also dependent upon the "high voltage" supplied to the photomultiplier tube (28) by the high voltage supply (30). Preferably, the high voltage supply (30) is adjustable to permit the adjustment or variation of the magnitude of the high voltage supplied to the photomultiplier tube (28). In the preferred embodiment, the high voltage supply (30) is connected with at least one battery (32) which provides the power for the various downhole components of the system (20) including the high voltage supply (30), as discussed further below.

The "gain" of the gamma ray detector (24) defines the magnitude of the detector output signals generated by the photomultiplier tube (28). Further, the magnitude of the high voltage supplied to the photomultiplier tube (28) establishes, at least in part, the gain of the gamma ray detector (24). Preferably, the high voltage supply (30) is adjustable such that the gain of the gamma ray detector (24) may be adjusted or varied by adjusting or varying the magnitude of the high voltage.

The gamma ray logging system (20) is further preferably comprised of an analyzer (34) for sorting the detector output signals into a plurality of channels according to their parameter values in order to generate a detected gamma radiation spectrum. The detected gamma radiation spectrum provides an indication of a frequency of the parameter values as a function of the parameter values.

The system (20) may be used to generate a single detected gamma radiation spectrum or a plurality of detected gamma radiation spectra. However, in the preferred embodiment, the gamma ray detector (24) and the analyzer (34) are configured to generate a plurality of the detected gamma radiation spectra.

In the preferred embodiment, prior to communicating the detector output signals to the analyzer (34), the detector output signals are preferably shaped and amplified. For this purpose, the preferred embodiment of the system (20) is comprised of a shaping pre-amplifier (36) for providing appropriate shaping and amplification of the detector output signals prior to communicating the detector output signals to the analyzer (34).

Any known or conventional analyzer (34) may be used which is capable of generating the detected gamma radiation spectrum as discussed above. In the preferred embodiment, the analyzer (34) is comprised of a multi-channel analyzer. The analyzer (34) sorts the detected gamma radiation into channels according to the energy levels of the detected gamma radiation to generate at least one detected gamma radiation spectrum in which the amounts of the detected gamma radiation is indicated as a function of the channels. As well, the analyzer (34) preferably converts an analog signal to a digital signal. In particular, the analog detector output signals generated by the gamma ray detector (24) are converted by the analyzer (34) into digital detected gamma ray spectra. All subsequent processing of the detected gamma ray spectra may therefore be performed digitally.

More particularly, the analyzer (34) detects the pulse height of the electrical pulses comprising the detector output signals and increments the detected count in the channel corresponding with the pulse height. Following a preset collection time, a spectrum is provided by the analyzer (34) with the detected count of gamma radiation recorded as a function of channel.

The analyzer (34) may be configured to have any desired number of channels, preferably between about 256 and 2048 channels, although it may be configured for up to 4096 channels. As the number of channels increases, the precision or accuracy of the analyzer (34) and resulting spectra will improve. More preferably, the analyzer has between about 256 and 512 channels. In the preferred embodiment, the analyzer (34) is configured to provide 512 channels.

However, the number of channels has no relationship to the energy levels of the gamma radiation being detected. As indicated, the selected number of channels is dependent largely upon the desired precision or resolution of the energy levels. The range of actual energy levels being detected is variable depending upon a number of factors, including the size, efficiency and inherent purity of the scintillating crystal, the optical coupling between the scintillator (26) and the photomultiplier tube (28), the construction and materials comprising the gamma ray detector (24), the high voltage supply to the photomultiplier tube (28), the electronic amplification and the operating temperature of the downhole components such as the gamma ray detector (24) and the analyzer (34).

For instance, the channels may be configured to cover a range of energy levels of gamma radiation of between about 0 to 10,000 keV. The channel configuration and the range of energy levels to be covered thereby will be selected, at least in part, depending upon the radioactive material or isotopes anticipated or expected to be encountered within the borehole. However, preferably, the channels are configured to cover a range of energy levels of gamma radiation of between about 0 to 3,000 keV.

Thus, in the preferred embodiment, the analyzer (34) provides 512 channels over a range of energy levels of about 0-3,000 keV. In other words, each channel represents 11.7 keV. Further, the analyzer (34) preferably has a relatively fast processing time as compared with known or conventional analyzers. In the preferred embodiment, the analyzer (34) provides a 4.7 micro-second processing time.

The preferred embodiment of the analyzer (34) permits relatively more precise data to be generated and later analyzed, as compared with known analyzers. Further, higher energy levels and concentrations of gamma radiation may be detected without overloading the system (20). As well, the gamma radiation from a plurality of radioactive materials may be detected concurrently.

As indicated, following a preset collection time, a detected gamma radiation spectrum is generated by the analyzer (34). In the preferred embodiment, the gamma ray logging system (20) is further comprised of a memory device (38) for storing each detected gamma radiation spectrum generated by the analyzer (34). More particularly, the downhole components of the system (20) are configured to continuously repeat a sampling sequence comprised of the preset collection time followed by a preset memory storage time.

During the preset collection time, the information or data is gathered resulting in the generation of a single detected gamma radiation spectrum by the analyzer (34). During the preset collection time, the data is temporarily stored within a buffer. Subsequently, during the preset memory storage time, the detected gamma radiation spectrum is communicated or downloaded from the buffer to the memory device (38) for storage. The buffer is then cleared and the sampling sequence is repeated, resulting in the generation and storage of a plurality of detected gamma radiation spectra in the memory unit (38).

In the preferred embodiment, the sampling sequence is repeated every one second. Thus, a detected gamma radiation spectrum is generated every second. Of this one second sampling sequence, the preset collection time is about 0.9 seconds, while the preset memory storage time is about 0.1 seconds.

The memory device (38) may be comprised of any known or conventional memory device or storage unit which is suitable for, and capable of, storing the detected gamma radiation spectra. Preferably, the detected gamma radiation spectra are communicated to the memory device (38) by the analyzer (34) and time stamped for later retrieval and processing, as discussed below.

In the preferred embodiment, the memory device (38) is comprised of a memory controller (40) for controlling the collection of the detected gamma radiation spectra and any further or additional desired downhole data or information according to a preset program. The memory device (38) is also comprised of a memory unit (42) for actual storage of the data. The memory unit (42) is preferably comprised of a non-volatile memory, such as a flash memory, wherein all detected gamma radiation spectra and other data are preferably recorded or stored as a function of specified time periods selected to be suitable for the logging speed utilized. In other words, all of the data is preferably time stamped to assist with later analysis and processing of the data.

In addition to storing the detected gamma radiation spectra generated by the analyzer (34), the memory device (38) may also store any further desirable data which may be acquired by the system (20) or other components, tools or sensors comprising or associated with the system (20). In the preferred embodiment, the further data relates to additional downhole conditions or characteristics within the borehole (22) or the surrounding formation.

For instance, in the preferred embodiment, the system (20) is further comprised of a temperature sensor (44). As discussed further below, the temperature sensor (44) is preferably associated with the gamma ray detector (24) and is utilized to initially set the high voltage supplied to the photomultiplier tube (28) and thereby establish the gain as a function of the temperature. Thereafter, the high voltage is maintained constant for the logging process or during a logging mode of the system (20).

Further, in the preferred embodiment, the temperature sensor (44) senses the temperature within the borehole (44) during the logging mode of the system (20) or while the detected gamma radiation spectra are being generated within the borehole (22). Preferably, the temperature sensor (44) generates the temperature data and communicates the temperature data to the memory device (38) where it is time stamped for later retrieval and processing, as discussed below. Specifically, the temperature data may be utilized for later calibration of the detected gamma radiation spectra.

As well, further components, tools or sensors may be associated with the previously described components of the system (20) and the memory device (38) such that other parameters or characteristics of the borehole (22) or the surrounding formation may be logged or recorded concurrently with the gamma ray logging by the system (20). For instance, a known or conventional pressure sensor (not shown) and/or a known or conventional casing collar locator (CCL) (not shown) may be utilized to generate additional data for storage in the memory device (38).

In the preferred embodiment, the gamma ray detector (24) and the analyzer (34) are adapted for use in the borehole (22) and are particularly adapted to be lowered into and run through the borehole (22) during performance of their respective functions. Thus, the gamma ray detector (24) detects the gamma radiation and generates the detector output signals downhole or while contained or located within the borehole (22). Similarly, the analyzer (34) sorts the detector output signals and generates the detected gamma radiation spectra downhole or while contained or located within the borehole (22). Thus, the detected gamma radiation spectra represent the gamma radiation received or detected over a desired interval of the borehole (22).

In addition, the memory device (38) is also preferably adapted for use in the borehole (22) and is particularly adapted to be lowered into and run through the borehole (22) during performance of its function. Thus, the memory device (38) stores the detected gamma radiation spectra downhole or while contained or located within the borehole (22). In the preferred embodiment, the memory device (38) is particularly adapted to be lowered into and run through the borehole (22) with both the gamma ray detector (24) and the analyzer (34).

Finally, the additional sensors or tools, such as the temperature sensor (44), are also adapted for use in the borehole (22) and are particularly adapted to be lowered into and run through the borehole (22) during performance of their respective functions. Thus, for instance, the temperature sensor (44) senses the temperature downhole or while contained or located within the borehole (22). In the preferred embodiment, the temperature sensor (44) is particularly adapted to be lowered into and run through the borehole (22) with the gamma ray detector (24), the analyzer (34) and the memory device (38).

Each of the memory device (38), the gamma ray detector (24), the analyzer (34) and the temperature sensor (44) are preferably lowered into the borehole (22) as a unit, in any conventional or known manner. In the preferred embodiment, each of the memory device (38), the gamma ray detector (24), the analyzer (34), the temperature sensor (44) and associated components are contained within a housing (46) or sonde which is lowered into the borehole (22) from the surface. For ease of reference, the components of the system (20) contained within the housing (46) for lowering within the borehole (22) may also be referred to herein as the "downhole components" of the system (20).

In this regard, as discussed above, power for each of the downhole components of the system (20) contained within the housing (46) is provided by at least one battery (32) which is also preferably contained within the housing (46) for lowering within the borehole (22). The battery (32) or batteries are to selected to provide the required power to all of the downhole components of the system (20) for the duration of the logging process or to permit the completion of the desired logging process. Further, in order to facilitate the connection of the battery (32) to the other downhole components, a single connector port (48) or interface is preferably provided between the battery (32) and each of the other downhole components of the system (20) contained within the housing (46) and requiring a power supply. In the preferred embodiment, the connector port (48) is comprised of a 5 pin slip ring interconnect assembly.

If desired, the battery (32) and one or more of the downhole components of the system (20) may be operatively connected or associated with a system power switch (49). The system power switch (49) is provided in order to permit the power from the battery (32) to be selectively turned on or off to one or more of the associated downhole components as required or desired to operate the system (20) effectively and to conserve power.

The housing (46) and the downhole components of the system (20) contained therein may be lowered into the borehole (22) using any conventional or known equipment or process, such as on a pipe string, coiled tubing, wireline or slickline. However, as indicated, preferably the detected gamma radiation spectra, the temperature data and any additional sensor data are all stored downhole in the memory device (38) for later retrieval and analysis at the surface. As a result, communication between the downhole components of the system (20) and the surface is not required. Accordingly, in the preferred embodiment, the housing (46) is lowered through the borehole (22) from the surface utilizing a slickline (50) or cable.

Further, the slickline (50) preferably lowers or runs the downhole components of the system (20) through the borehole (22) utilizing a hoist (51) or other suitable reel mechanism at the surface. In the preferred embodiment, the depth of the downhole components of the system (20) within the borehole (22) and the surrounding formation, and particularly the depth of the gamma ray detector (24), is also recorded for use in the later processing of the data. For this purpose, a depth recorder or depth encoder (not shown) may be associated with the hoist (51). For instance, a depth recorder may record the length of the slickline (50) played or reeled out or run through the borehole (22) in order to determine the depth of the gamma ray detector (24). Preferably this data or depth information is time stamped or tagged with a synchronized time stamp. Alternately, or in addition to a surface depth recorder, a downhole casing collar locator or other downhole depth recorder may be used. In this case, the depth data is also preferably time stamped and stored in the memory device (38) for later retrieval.

Further, the system (20) is comprised of a processor (52). The processor (52) is configured to perform a calibration of the detected gamma radiation spectrum, preferably a plurality of detected gamma radiation spectra. Specifically, the processor (52) is configured to perform the method of calibration as discussed in detail below. In addition, the processor (52) may also be utilized to program any necessary downhole electronic components of the system (20), such as the analyzer (34) and the memory controller (40), relating to the gathering and storing of the data downhole. The processor (52) may be comprised of any known or conventional processor, computer or central processing unit (CPU) suitable for and capable of performing the functions of the processor (52) as described herein.

In the preferred embodiment, the processor (52) is intended to be utilized and the calibration is intended to be performed following the completion of the logging process. Thus, the system (20) is actuated to or operated in a logging mode in order to generate the detected gamma radiation spectra and other sensed data downhole within the borehole (22) and to store the data in the memory device (38), as described above. Following generation and storage of the desired data, the system (20) is actuated to or operated in a communication mode. The communication mode permits downloading of the stored data from the memory device (38) to the processor (52) and the calibration of the detected gamma radiation spectra by the processor (52), and is preferably performed out of the borehole (22) at the surface.

Thus, the processor (52) is preferably adapted to be located outside of the borehole (22) and is not one of the downhole components of the system (20). Further, the processor (52) is adapted to be connected with the memory device (38) after the memory device (38) has been retrieved from the borehole (22) so that the processor (52) may access the detected gamma radiation spectra and other sensed data stored therein.

In the preferred embodiment, in order to facilitate the connection of the processor (52) to the memory unit (38), the processor (52) includes a connector (54) or interface compatible with the connector port (48) provided for connection of the downhole components of the system (20) with the battery (32). Thus, once the housing (46) is retrieved to the surface and removed from the borehole (22), the battery (32) may be disconnected or removed from the connector port (48). The compatible connector (54) of the processor (52) may then be connected with the connector port (48) to permit communication between the processor (52) and the downhole components, including the memory device (38).

In the preferred embodiment, the connection of the battery (32) with the connector port (48) signals the downhole components of the system (20) to switch or be actuated to the logging mode. The disconnection of the battery (32) from the connector port (48) signals the downhole components to stop gathering data and to re-set to the communication mode. Thus, upon connection of the processor (52) with the connector port (48), the processor (52) may access and download the stored data from the memory device (38) and later perform the calibration of the detected gamma radiation spectra.

More particularly, in operation, the downhole components of the system (20) are powered up at the surface and linked or connected with the processor (52) via the connector port (48). The processor (52) is utilized to program the downhole components of the system (20) to generate the desired data. Preferably, the generated data, including the detected gamma radiation spectra, is recorded as a function of time. Similarly, the depth of the gamma ray detector (24) in the borehole (22) is preferably recorded as a function of time. As a result, the generated data may be correlated with the depth in the borehole (22).

As discussed above, the information or data concerning the depth of the gamma ray detector (24) in the borehole (22) may be provided utilizing any known or conventional depth sensor or mechanism for determining depth. For instance, the depth may be provided through the use of a downhole casing collar locator or other downhole depth indicator, as discussed above. Alternately or additionally, the depth may be provided through the use of a surface depth indicator associated with the surface hoist (51) or other surface equipment as discussed above. Thus, the depth indicator may comprise a component of the system (20) or be a separate system or mechanism associated with the gamma ray logging system (20) to provide the necessary depth and time data.

The program provided by the processor (52) preferably provides instructions to the downhole components of the system (20) including, but not limited to: the commencement of the logging process or when to start the generation and storage of the data; the termination of the logging process or when to stop the generation and storage of the data; and the sampling sequence including the preset collection time and the preset memory storage time.

Once the programming is completed, the processor (52) is disconnected from the connector port (48). The battery (32) is then connected with the connector port (48) in order to power up the downhole components of the system (20) and to actuate the system (20) to the logging mode. The downhole components, including the battery (32), are contained or placed within the housing (46) in preparation for placement within the borehole (22). The housing (46) is then lowered into the borehole (22) with the hoist (51) to the desired zone or interval within the surrounding formation.

Once the housing (46) is placed in the desired zone, the temperature within the borehole (22) is determined using the temperature sensor (44). Downhole electronics associated with the various downhole components of the system (20) utilize the sensed temperature data to perform an initial calibration of the gamma ray detector (24) downhole. More particularly, the high voltage supply (30) is adjusted based upon the sensed temperature data and known characteristics of the gamma ray detector (24) in order to provide an initial setting of the high voltage supplied to the photomultiplier tube (28). Thus, a normal or default setting of the high voltage supply is provided. Thereafter, the high voltage setting is maintained throughout the logging mode of the system (20). No further downhole adjustment is performed. However, as indicated previously, further temperature data is sensed by the temperature sensor (44), time stamped and recorded in the memory device (38) for later processing and use by the processor (52), if desired.

The gamma ray detector (24) is then run one or more times through the zone of interest in the borehole (22) such that the analyzer (34) generates a plurality of detected gamma radiation spectra which are stored in the memory device (38) according to the sampling sequence as described above. The sampling sequence is preferably repeated continuously until the end time or pre-programmed termination period is reached. Other downhole data may also be collected as desired during this time period and stored within the memory device (38). For instance, as discussed previously, the temperature sensor (44) may provide temperature data, which is preferably time stamped and stored in the memory device (38). Further, depth data may be provided by a casing collar locator and/or pressure data may be provided by a downhole pressure sensor. In each case, this further data is also preferably time stamped and stored in the memory device (38).

Further, the detected gamma radiation spectra is collected in analog form and shaped and amplified by the pre-amplifier (36), which is also an analog component. Thus, analog data from the pre-amplifier (36) is provided to the analyzer (34). The analyzer (34) converts the data from analog form to digital form such that the later processing of the data may be performed digitally. Further, the digital data from the analyzer (34), being the detected gamma radiation spectra, is time stamped and stored in the memory device (38).

Once the logging is completed, the housing (46) is pulled from the borehole (22) and the downhole components of the system (20) are retrieved from the housing (46) at the surface. At the surface, the battery (32) is then disconnected from the connector port (48), which actuates the downhole components of the system (20) from the logging mode to the communication mode. The loss of power acts as a signal to the components to reset or switch modes. The processor (52) is then connected to the connector port (48) and all of the data and information stored in the memory device (38) is downloaded to the processor (52).

Where depth information is gathered and stored downhole, the depth data is downloaded to the processor (52) concurrently with the detected gamma radiation spectra and other downhole data, such as temperature. Where the depth data is gathered uphole or by a separate depth indictor, the depth data is also preferably downloaded to the processor (52). In the preferred embodiment, the depth data is subsequently merged with the other downloaded data in order to plot sensor readings as a function of depth. In any event, the downloaded data is preferably stored in the hard drive of the processor (52) for later processing and calibration of the detected gamma radiation spectra, as described below. If desired, the downloaded data may be uploaded to a website for access by an analyst for processing.

Figure 3:
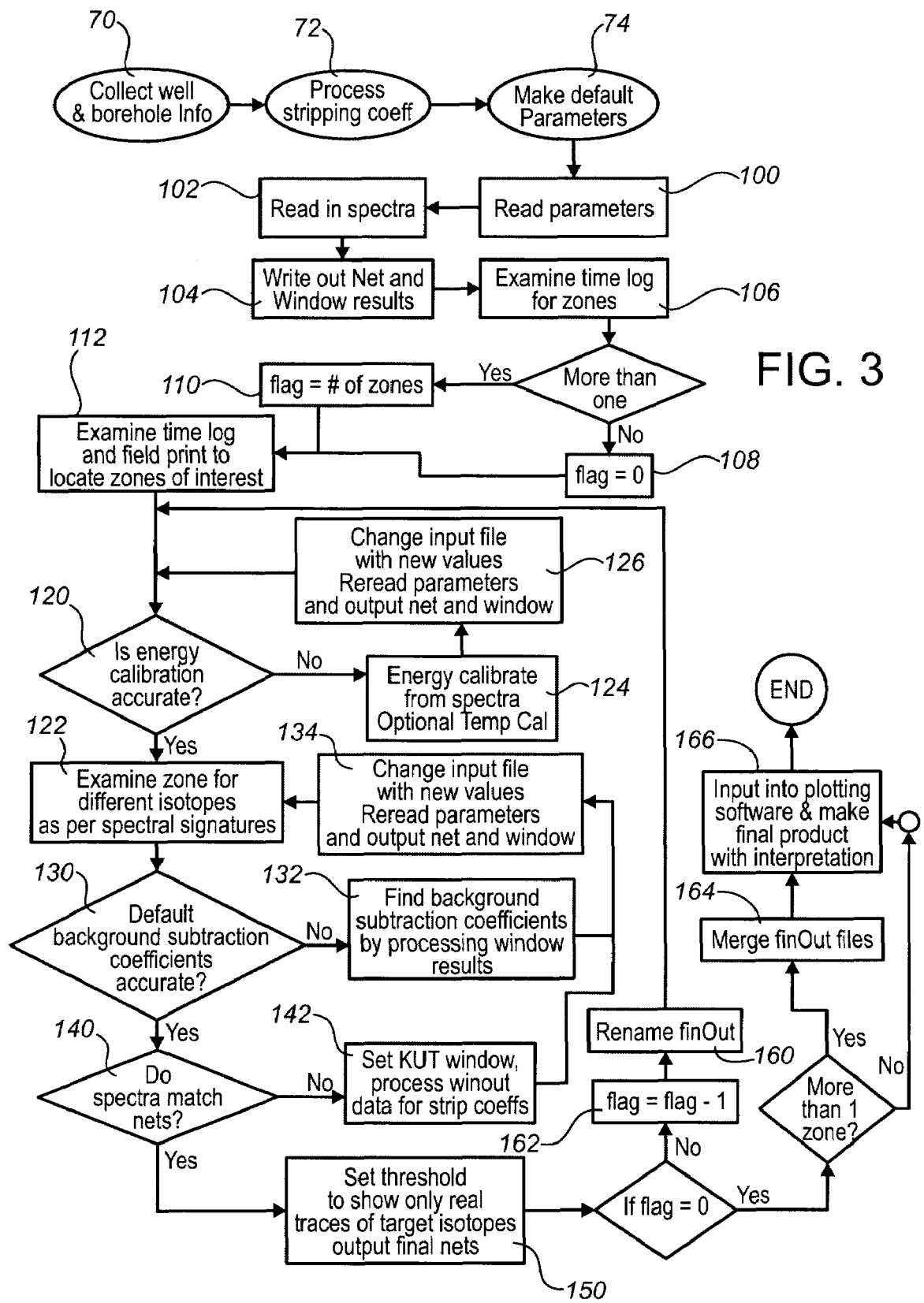
FIG. 3 is a flow chart depicting a preferred embodiment of an overall method for processing data acquired by a gamma radiation logging tool.

Referring to FIG. 3, a flow chart is provided which depicts the preferred embodiment of an overall method for processing the data which is acquired by the gamma ray detector (24) and which is stored in the memory device (38). The method includes the method of the invention.

In the preferred embodiment, the overall method is performed using the processor (52). In the preferred embodiment, the processor (52) is provided by a general purpose computer which is programmed to facilitate the performance of the overall method. The overall method and the method of the invention may be performed uninterrupted, or may be performed in stages to allow for interaction between the processor (52) and an analyst (not shown) who is performing the overall method using the processor (52).

The overall method includes preliminary operations (70, 72,74) which are performed in order to model the borehole and calculate parameters which are used to process the acquired data.

Referring to preliminary operation (70), a set of borehole information relating to the borehole which is being logged is collected and input into the computer. The borehole information may include the following:

(i) casing diameter;
(ii) casing wall thickness;
(iii) tubing dimensions;
(iv) borehole fluid type;
(v) borehole fluid density;
(vi) cement thickness;
(vii) formation type(s);
(viii) formation porosity; and
(ix) type of isotopes (i.e., introduced gamma radiation sources) to be injected.

Referring to preliminary operations (72,74), computer modelling is performed using the borehole information in order to calculate parameters including the following:

(i) number of isotopes to be injected;
(ii) spectral signatures for the isotopes;
(iii) photopeak to Compton scattering ratio;
(iv) identification of energy windows of interest for each isotope;
(v) default background subtraction coefficients for background radiation such as KUT (i.e., naturally occurring gamma radiation sources); and
(vi) stripping coefficients for the energy windows of interest for each of the isotopes to be injected.

The computer modelling is preferably performed by applying a Monte Carlo method. In the preferred embodiment the computer modelling is performed using a Monte Carlo N-Particle Transport Code (MCNP) software package.

The computer modelling results in predicted spectra for each of the isotopes under the borehole conditions specified in the borehole information. The predicted spectra are used to determine the energy windows of interest for each of the isotopes. The energy windows of interest are used to calculate stripping coefficients for each isotope in each of the energy windows of interest.

Figure 4:
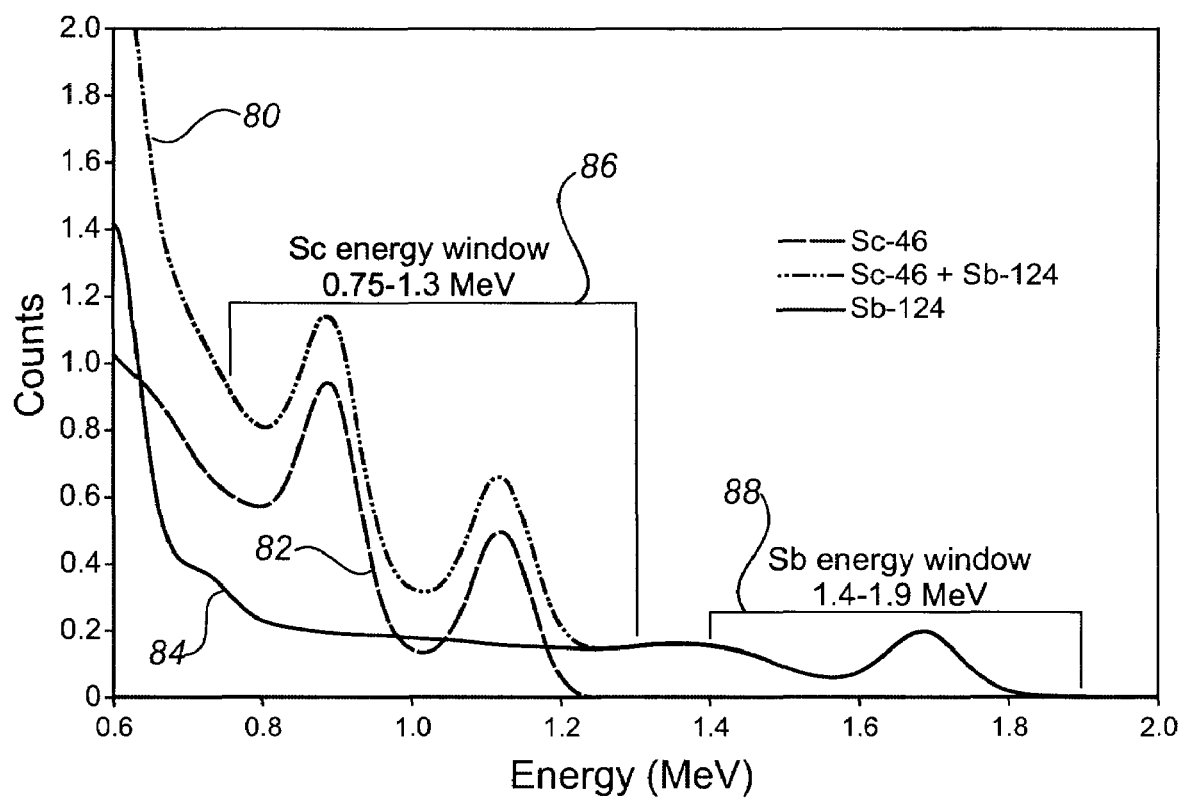
FIG. 4 is a graph depicting partial spectra for a portion of the total energy range, including a spectral signature for scandium (Sc-46), a spectral signature for antimony (Sb-124), and a composite spectrum including both Sc-46 and Sb-124.

Referring to FIG. 4, simplified partial spectra are depicted in which the isotopes present are scandium (Sc-46) and antimony (Sb-124). Line (80) depicts a composite spectrum which includes both Sb-124 and Sc-46. Line (82) depicts the spectral signature of Sc-46. Line (84) depicts the spectral signature of Sb-124.

A first energy window of interest (86) includes two peaks which are characteristic of Sc-46. A second energy window of interest (88) includes one peak which is characteristic of Sb-124. Each energy window of interest (86,88) contains a "gross energy count", which is the integral of the composite spectrum (80) over the energy window of interest (86,88), or the area under the composite spectrum (80) through the energy window of interest (86,88).

The stripping coefficients represent the contributions that the isotopes make to the energy windows of interest based upon a unit amount or concentration of the isotopes. As a result, by knowing the gross energy count of the energy windows of interest and the stripping coefficients, the amount or concentration of each isotope which is contributing to the composite spectrum can be determined. The spectral signatures of the isotopes, the composite spectrum, and the stripping coefficients are all dependent upon the borehole information.

Once at least one energy window of interest has been identified for each isotope, the stripping coefficients can be calculated algebraically by solving a number of equations which is equal to the number of stripping coefficients to be calculated, having regard to the gross energy counts from each of the energy windows of interest.

Solving the equations may be simplified by using matrix mathematics to compute the stripping coefficients. For example, the above simplified composite spectrum may be solved to determine the stripping coefficients for the two isotopes in the two energy windows of interest by multiplying a 2×2 matrix of stripping coefficients by a 2 row column vector of the gross energy counts for the two energy windows of interest. The contributions of the individual isotopes to the composite spectrum as determined using the stripping coefficients is referred to as the "net energy counts" for the isotopes.

The preliminary operations may be performed before, after or while the gamma ray detector (24) is acquiring the data.

Once the preliminary operations (70,72,74) have been completed and the parameters have been calculated (74), the parameters are read (100) by the processor (52) so that they are available for processing the acquired data.

Referring to FIG. 3, the detected gamma radiation spectra and other acquired data are then read (102) by the processor (52) so that the data may be processed. The acquired data which is read (102) by the processor (52) may include any of the information which is included in a previously generated field print, and may include the results of any preliminary processing which was performed in order to generate the field print.

In the preferred embodiment, the following data at a minimum is read by the processor before processing of the data occurs:

(i) each detected gamma radiation spectrum; and
(ii) the time stamp for each detected gamma radiation spectrum;

Other acquired data which may be read (102) by the processor (52) include the following:

(i) the depth log for the borehole (22) as a function of the time stamps;
(ii) a pressure log for the borehole (22);
(iii) a temperature log for the borehole (22);
(iv) casing collar locator (CCL) data;
(v) a temperature log for the gamma ray detector (24); and
(vi) any other acquired data or results of preliminary processing at the wellsite.

Once all of the detected gamma radiation spectra have been read (102) by the processor (52), sets of initial results are calculated and written (104) as an input file. Each set of initial results includes a time stamp, a gross energy count for each energy window of interest, and net energy counts for each isotope for each energy window of interest. The initial results are based upon the parameters and upon the gain calibration of the gamma ray detector (24) which was performed before the detected gamma radiation spectra were generated.

Once the input file is written (104), the time log is examined to identify zones (106) within the logged data. The identification of zones may be made by identifying groups of adjacent detected gamma radiation spectra which exhibit similar characteristics. For example, a zone may be defined by groups of detected gamma radiation spectra which exhibit similar peaks and/or may be defined by groups of adjacent detected gamma radiation spectra which exhibit no obvious peaks which may correspond with the spectral signatures of the introduced isotopes.

Once the zones have been identified (106), the detected gamma radiation spectra from the zones may be processed. If only one zone is identified, the processor (52) assigns a "flag=0" value (108) to the detected gamma radiation spectra from the zone. If more than one zone is identified, the processor (52) assigns a "flag=number of identified zones" value (110) to the detected gamma radiation spectra which make up the first zone to be processed or considered for processing.

The identified zones may be processed in sequence or simultaneously, depending upon the processing capabilities of the processor. In the preferred embodiment the identified zones are processed sequentially. Similarly, the detected gamma radiation spectra making up a zone may be processed in sequence or simultaneously. In the preferred embodiment the detected gamma radiation spectra in each zone are processed sequentially.

All of the identified zones may be processed. Alternatively, the field print may be compared with the identified zones in order to locate zones of interest (112) and thus potentially eliminate some identified zones from processing. The zones of interest may be defined by groups of adjacent detected gamma radiation spectra which represent formations within which fracturing has been performed and isotopes have been introduced, or formations which otherwise may provide gamma radiation information of value.

In the event that zones of interest are located and other zones are eliminated from processing, the assignment of the flag by the processor (108,110) may be repeated, having regard to the reduced number of zones of interest in comparison with the identified zones.

Once an identified zone or a zone of interest has been chosen for processing, the detected gamma radiation spectra within the chosen zone are processed. As previously indicated, in the preferred embodiment the detected gamma radiation spectra are processed sequentially. As a result, the description that follows relates to the processing of a single detected gamma radiation spectrum from a chosen zone. The processing of the detected gamma radiation spectra may include but does not necessarily include the method of the invention.

The detected gamma radiation spectrum is first examined to determine whether the default gain calibration of the gamma ray detector is accurate (120) for the detected gamma radiation spectrum. The determination of whether the default gain calibration is accurate is made according to an accuracy threshold. The accuracy threshold relates to the extent to which observed peaks in the detected gamma radiation spectrum correlate with known actual energy levels which are represented by the peaks.

The accuracy determination may be made using the detected gamma radiation spectrum "as is". In the preferred embodiment, the detected gamma radiation spectrum is refined before the accuracy determination is made. The refining of the detected gamma radiation spectrum in the preferred embodiment comprises fitting all or some of the peaks in the detected gamma radiation spectrum to a Gaussian curve.

Preferably the accuracy determination is made having regard to the centroids of the peaks in the detected gamma radiation spectrum. In the preferred embodiment the accuracy determination is made having regard to the centroids of the peaks in the detected gamma radiation spectrum after the peaks have been fitted to a Gaussian curve. In the preferred embodiment the accuracy threshold is that the energy levels of the centroids of the Gaussian curves must be within +/−2 percent of the known actual energy levels of the peaks in order to provide an acceptable level of correlation.

If the default energy gain calibration of the gamma ray detector provides an acceptable level of correlation, then the detected gamma radiation spectrum may be considered to be a calibrated gamma radiation spectrum and is examined for the presence of introduced isotopes as per the modelled spectral signatures for the introduced isotopes (122).

If the default gain calibration of the gamma ray detector does not provide an acceptable level of correlation, then the detected gamma radiation spectrum is calibrated (124) in accordance with the method of the invention.

The calibration of the detected gamma radiation spectrum is described with reference to FIGS. 5-8.

Figure 5:
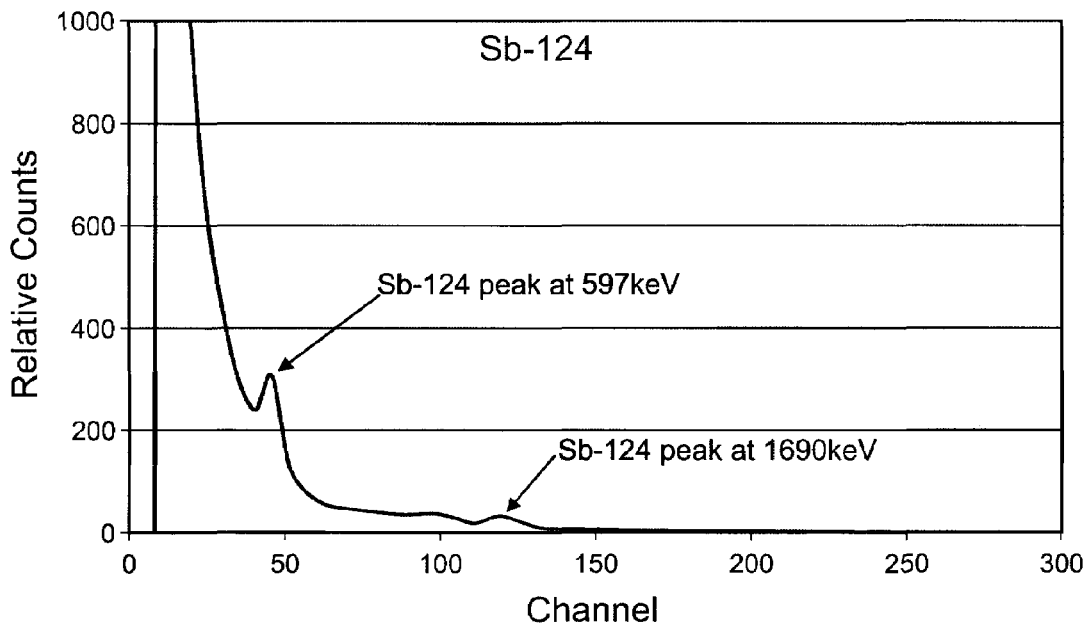
FIG. 5 is a graph depicting a spectral signature for antimony (Sb-124) in a 5.5 inch casing.

Referring to FIG. 5, a spectral signature for antimony (Sb-124) in a 5.5 inch casing is depicted. The spectral signature includes two peaks which have known actual energy levels of 597 keV and 1690 keV. A third small peak having a known actual energy level of 2090 keV is also present, but is not observable in FIG. 5.

Figure 6:
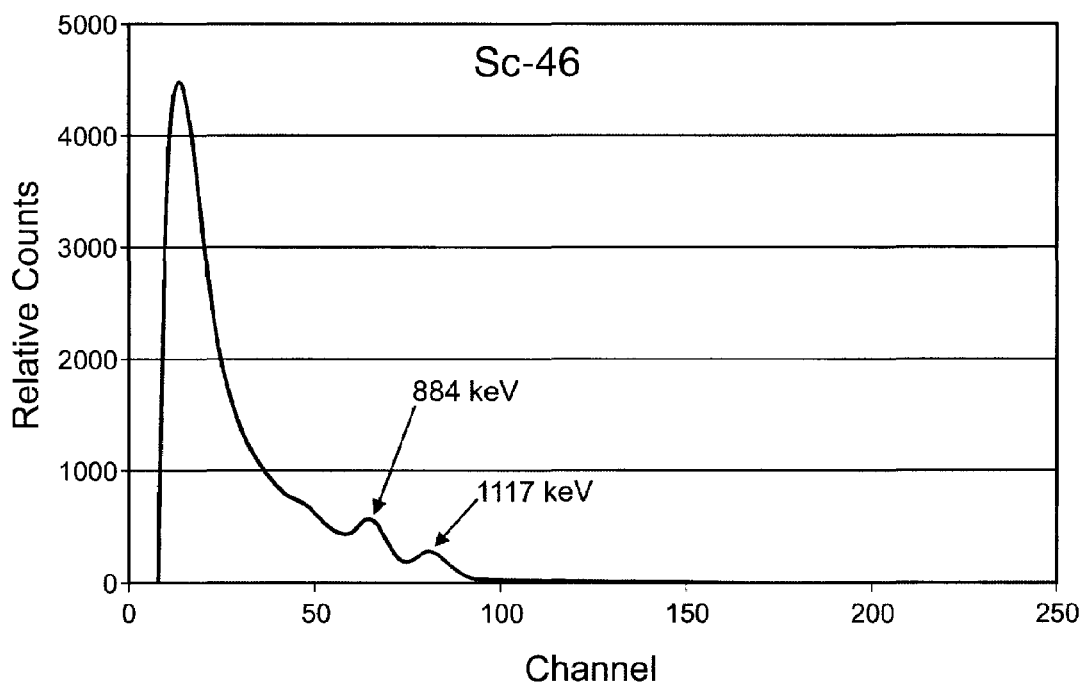
FIG. 6 is a graph depicting a spectral signature for scandium (Sc-46) in a 5.5 inch casing.

Referring to FIG. 6, a spectral signature for scandium (Sc-46) in a 5.5 inch casing is depicted. The spectral signature includes two peaks which have known actual energy levels of 884 keV and 1117 keV.

Figure 7:
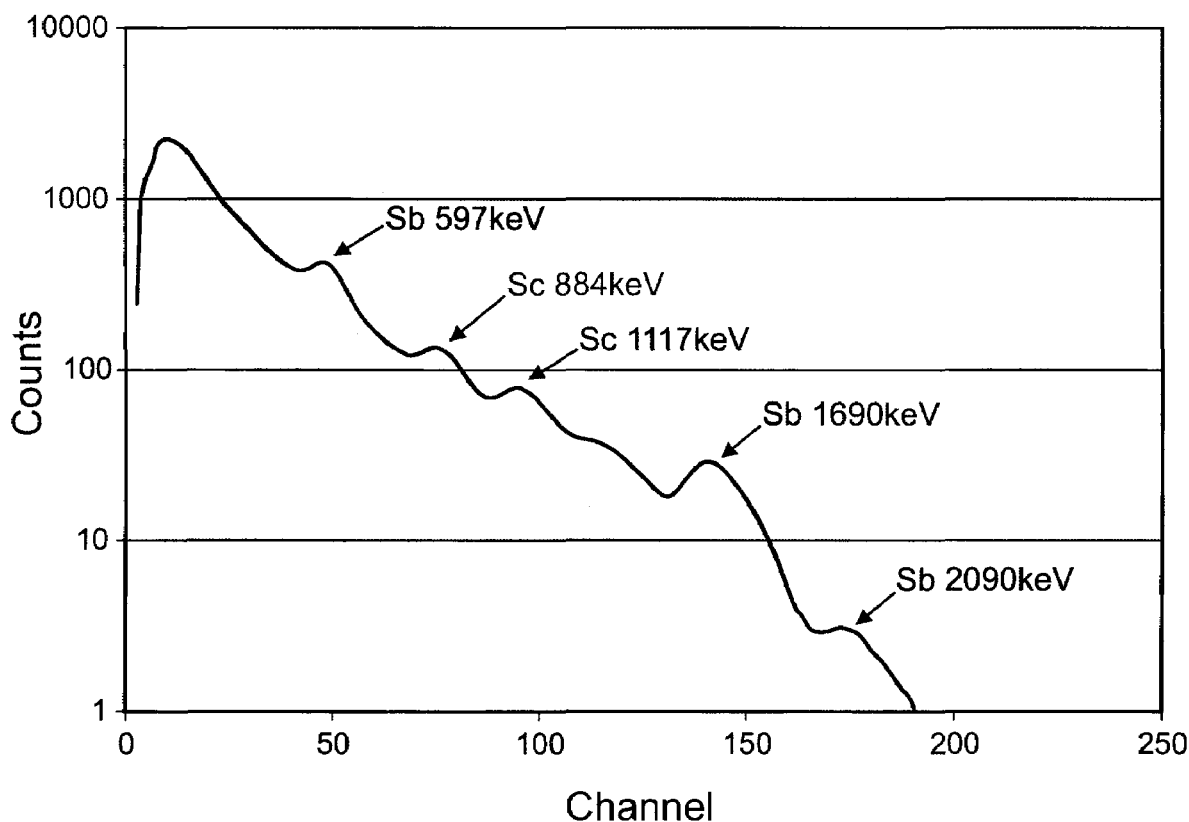
FIG. 7 is a graph depicting a detected gamma radiation spectrum including contributions from Sb-124 and Sc-46.

Referring to FIG. 7, a detected gamma radiation spectrum including contributions from Sb-124 and Sc-46 is depicted. The detected gamma radiation spectrum includes the 597 keV peak from Sb-124 at about channel 48 as a centroid channel, the 1690 keV peak from Sb-124 at about channel 145 as a centroid channel, the 2090 keV peak from Sb-124 at about channel 180 as a centroid channel, the 884 keV peak from Sc-46 at about channel 75 as a centroid channel, and the 1117 keV peak from Sc-46 at about channel 95 as a centroid channel.

The five selected peaks for Sb-124 and Sc-46 provide five selected data points which can be used to calibrate the detected gamma radiation spectrum. Each of the selected data points includes a known actual energy level and a parameter value. In FIG. 7, the parameter values are centroid channels. The parameter values could also be expressed as detected energy levels, since the channels are representative of detected energy levels.

Figure 8:
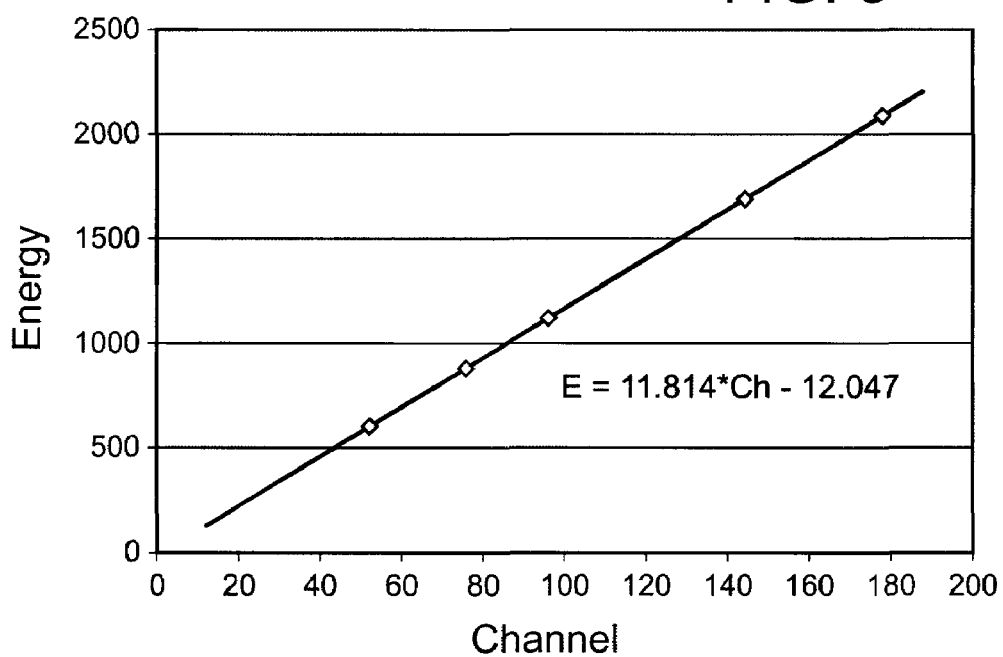
FIG. 8 is a graph depicting a plot of the centroid channels of the selected peaks in FIG. 7 against the known actual energy levels of the selected peaks.

Referring to FIG. 8, a plot of the centroid channels of the selected peaks in FIG. 7 against the known actual energy levels of the selected peaks is depicted. The centroid channels depicted in FIG. 8 were obtained by refining the peaks in the detected gamma radiation spectrum of FIG. 7. The peaks were refined by fitting the peaks to a Gaussian peak shape. The centroid channels depicted in FIG. 8 were then determined from the fitted Gaussian-shape curves.

The plot depicted in FIG. 8 is used to determine a mathematical relationship for the selected data points. The mathematical relationship may be determined using any suitable curve fitting technique, such as a least squares method or a cubic spline method.

In the exemplary embodiment depicted in FIGS. 5-8, the mathematical relationship is a linear relationship. The mathematical relationship may, however, be comprised of one or more polynomial relationships, depending upon the correlation between the known actual energy levels and the selected peaks.

The linear relationship depicted in FIG. 8 has the following general form:

$$\text{Actual Energy Level} = a(\text{Adjusted Parameter Value}) + b \quad (1)$$

In the exemplary embodiment of FIGS. 5-8, the mathematical relationship may be expressed as follows:

$$E = 11.814 * Ch + 12.047 \quad (2)$$

where: E=Actual Energy Level

Ch=Adjusted Channel or Adjusted Parameter Value

The mathematical relationship may be used to generate a calibrated gamma radiation spectrum in which the parameter values from the detected gamma radiation spectrum are adjusted to provide adjusted parameter values.

Although the calibration of the detected gamma radiation spectrum has been described graphically, the calibration may alternatively be performed algebraically.

Once the calibrated gamma radiation spectrum has been generated, the parameters are reread and the input file containing the sets of initial results is changed (126) to reflect the new gross energy count and the new net energy counts for the calibrated gamma radiation spectrum which may result from the calibration of the detected gamma radiation spectrum.

The calibrated gamma radiation spectrum may be examined to determine whether the calibrated gamma radiation spectrum satisfies the accuracy threshold, which will now relate to the extent to which parameter values (i.e., observed peaks in the calibrated gamma radiation spectrum) correlate with known actual energy levels which are represented by the peaks.

If the calibrated gamma radiation spectrum provides an acceptable level of correlation, then the calibrated gamma radiation spectrum is examined for the presence of introduced isotopes as per the spectral signatures for the introduced isotopes (122).

If the calibrated gamma radiation spectrum does not provide the acceptable level of correlation, then the calibration procedure outlined above may be repeated, the parameters are reread, and the input file may be further changed to reflect the new gross energy count and net energy counts which may pertain to the further calibrated gamma radiation spectrum. The procedure of making the accuracy determination, re-calibrating the calibrated gamma radiation spectrum and changing the input file may be repeated as necessary in order to provide the acceptable level of correlation between adjusted parameter values and known actual energy levels.

Once the acceptable level of correlation between adjusted parameter values and known actual energy levels has been achieved, the calibrated gamma radiation spectrum is examined for the presence of introduced isotopes as per the spectral signatures for the introduced isotopes (122).

This procedure involves matching peaks observed in the calibrated gamma radiation spectrum with the spectral signatures of the introduced isotopes. The procedure may be assisted with reference to the depth log and/or the field print, which may provide guidance as to what isotopes were introduced at different intervals in the borehole and what peaks should be observed in the calibrated gamma radiation spectrum.

Once the introduced isotopes which are making contributions to the calibrated gamma radiation spectrum have been determined, the calibrated gamma radiation spectrum is further examined to determine if the default background subtraction coefficients which have been applied to the calibrated gamma radiation spectrum to account for naturally occurring gamma radiation are accurate (130).

Typically, naturally occurring gamma radiation sources do not contribute significantly to the calibrated gamma radiation spectrum in comparison with the contributions of introduced gamma radiation sources.

As a result, in the preferred embodiment, the default background subtraction coefficients are set at "0" for all energy windows of interest. Alternatively, the default background subtraction coefficients may be set at some arbitrary value, or the default background subtraction coefficients may be set at some value which is based upon historical logging data.

If peaks are observed in the calibrated gamma radiation spectrum which are not consistent with the spectral signatures of the introduced isotopes, then background radiation due to naturally occurring gamma radiation sources may be making a significant contribution to the calibrated gamma radiation spectrum, and the default background subtraction coefficients may not be accurate.

As a result, if it is determined that the default background subtraction coefficients are not accurate, new background subtraction coefficients for one or more of the energy windows of interest are obtained (132). The new background subtraction coefficients may be set at some arbitrary value, or the new background subtraction coefficients may be set at some value which is based upon historical logging data.

Once the new background subtraction coefficients have been obtained, the parameters are reread and the input file is changed (134) to reflect the new gross energy count and the new net energy counts for the calibrated gamma radiation spectrum which may result from the new background subtraction coefficients.

Once the new background subtraction coefficients have been obtained and the input file has been changed, the calibrated gamma radiation spectrum is examined to determine whether the calibrated gamma radiation spectrum matches the net energy counts which are predicted using the stripping coefficients for the introduced isotopes (140).

The determination of whether the calibrated gamma radiation spectrum matches the net energy counts is made so that a statistically valid declaration may be made as to whether an introduced isotope is making a contribution to the calibrated gamma radiation spectrum. In the preferred embodiment, a statistical threshold is chosen so that the identification of a peak in the calibrated gamma radiation spectrum is made with no greater than about thirty percent uncertainty.

If the calibrated gamma radiation spectrum matches the net energy counts according to the statistical threshold, the calibrated gamma radiation spectrum may be finally processed to set threshold values for counts in the calibrated gamma radiation spectrum in order to eliminate noise and any further effects of naturally occurring gamma radiation sources, and final changes may be made to the input file (150).

If the calibrated gamma radiation spectrum does not match the net energy counts according to the statistical threshold, the calibrated gamma radiation spectrum may be further processed to calculate stripping coefficients for the naturally occurring gamma radiation sources which are specific to the borehole conditions and environment under which the calibrated gamma radiation spectrum was generated (142). These stripping coefficients for naturally occurring gamma radiation sources may be determined in a similar manner as the stripping coefficients which were determined with respect to the introduced isotopes.

Once the stripping coefficients for the naturally occurring gamma radiation sources have been calculated, the parameters are reread and the input file is changed to reflect the new total energy count and new net energy counts (134).

Once the calibrated gamma radiation spectrum does match the net energy counts in the input file (140), the calibrated gamma radiation spectrum is finally processed to set threshold values for counts in the calibrated gamma radiation spectrum in order to eliminate noise and any further effects of naturally occurring gamma radiation sources, and final changes relating to the calibrated gamma radiation spectrum may be made to the input file (150).

The processing of the detected gamma radiation spectrum is repeated for each detected gamma radiation spectrum within the identified zone or zone of interest which is being processed.

The calibration of the detected gamma radiation spectra is dependent upon the temperature of the gamma ray detector (24) during the acquisition of the detector output signals. Typically, the temperature change throughout an identified zone or zone of interest will not be significant enough to require individual calibration of each detected gamma radiation spectrum within a zone. As a result, the mathematical relationship determined for one detected gamma radiation spectrum from a zone may be applicable to other detected gamma radiation spectra from the same zone. If, however, a detected gamma radiation spectrum from a zone fails to provide an acceptable level of correlation between parameter values and known actual energy levels using a mathematical relationship previously established for the zone, the detected gamma radiation spectrum may be calibrated using the method of the invention.

Once the final changes to the input file for all detected gamma radiation spectrum within the identified zone or zone of interest have been made (150), the input file is renamed "finOut" (160) to prevent further unwanted changes to the input file. If there is more than one identified zone or zone of interest to be processed, the input file is renamed "finOut 1" or some other name which will permit identification of the zone to which the input file relates.

If more than one identified zone or zone of interest is to be processed, the processor (52) assigns a "flag=flag−1" value (162) to the detected gamma radiation spectra which make up the next zone to be processed or considered for processing, and the next zone is processed.

The temperature change between identified zones or zones of interest may or may not be significant enough to require a new mathematical relationship to be determined when successive zones are processed. If the detected gamma radiation spectra within a successive zone provide the acceptable level of correlation between parameter values and known actual energy levels, a new mathematical relationship need not be determined for the successive zone. If, however, the detected gamma radiation spectra within the successive zone fail to provide the acceptable level of correlation, a new mathematical relationship can be determined for the successive zone.

When the final changes to the input file for all detected gamma radiation spectrum within the next zone have been made, the input file is renamed "finOut 2" (160) or some other unique name to prevent further unwanted changes to the input file and to permit identification of the zone to which the input file relates.

Once all identified zones or zones of interest have been processed, the finOut files are merged (164), and the finOut files are input into plotting software which creates a final product for delivery to the customer (166).

The final product will include information about the total energy count and the net energy counts throughout the identified zones or zones of interest. The final product may also include other or ancillary information relating to the data acquired by the gamma ray detector (24) or relating to data acquired by other instruments or tools which may be included in the gamma ray logging system (20).

The system (20) of the invention therefore provides a gamma ray detector (24), an analyzer (34) and a processor (52) which provide calibrated gamma radiation spectra without requiring adjustment of the high voltage which is delivered to the gamma ray detector (24). The method of the invention provides a method for calibrating detected gamma radiation spectra which uses the detected gamma radiation spectra and does not require the use of a reference gamma radiation source or gain adjustment of the gamma ray detector (24) during the logging operation.

Although the method of the invention may be performed without information regarding the temperature of the gamma ray detector (24), a modified method may provide calibration of detected gamma radiation spectra by using data relating to the temperature of the gamma ray detector during data acquisition.

In the modified method, the mathematical relationships which are developed in the calibration of some of the detected gamma radiation spectra may be interpolated or extrapolated using temperature data relating to the temperature of the gamma ray detector during data acquisition. In the modified method, the mathematical relationships are preferably interpolated.

For example, a first mathematical relationship may be developed for a first detected gamma radiation spectrum which is generated using data acquired while the gamma ray detector (24) is at a first temperature. Similarly, a second mathematical relationship may be developed for a second detected gamma radiation spectrum which is generated using data acquired while the gamma ray detector (24) is at a second temperature.

The modified method comprises establishing a calibration/temperature relationship between the mathematical relationships and the temperatures of the gamma ray detector (24). The calibration/temperature relationship may then be used to derive mathematical relationships for detected gamma radiation spectra without directly processing the detected gamma radiation spectra.

The modified method may facilitate a more precise calibration of detected gamma radiation spectra by applying derived mathematical relationships to detected gamma radiation spectra which may otherwise provide the required level of correlation between parameter values and known actual energy levels, and which thus would not be subjected to calibration using the method of the invention. The modified method may also decrease processing time by requiring only representative detected gamma radiation spectra to be calibrated using the method of the invention, and allowing other calibrations to be performed using the calibration/temperature relationship.

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A gamma ray logging system comprising:
   (a) a gamma ray detector for detecting gamma radiation at a plurality of actual energy levels and for generating detector output signals each representing a detected count of gamma radiation, wherein each of the detector output signals has a parameter value which is dependent upon the actual energy level of its associated detected count of gamma radiation;
   (b) an analyzer for sorting the detector output signals into a plurality of channels according to their parameter values in order to generate a detected gamma radiation spectrum, wherein the detected gamma radiation spectrum provides an indication of a frequency of the parameter values as a function of the parameter values; and (c) a processor which is configured to perform a calibration of the detected gamma radiation spectrum, wherein the calibration performed by the processor comprises:
  (i) selecting at least two data points from the detected gamma radiation spectrum, wherein each of the selected data points is comprised of a known actual energy level and its associated parameter value;
  (ii) determining a mathematical relationship for the selected data points; and
  (iii) adjusting the parameter values in the detected gamma radiation spectrum in accordance with the mathematical relationship, thereby generating a calibrated gamma radiation spectrum comprising adjusted parameter values.

2. The system as claimed in claim 1 wherein the gamma radiation is detected from at least one known gamma radiation source, wherein each of the known gamma radiation sources contributes a spectral signature to the detected gamma radiation spectrum, wherein the spectral signatures of each of the known gamma radiation sources are comprised of at least one peak, and wherein each of the selected data points is defined by a selected peak from the spectral signatures of the known gamma radiation sources.

3. The system as claimed in claim 2 wherein the parameter values comprising the selected data points are comprised of the centroids of the selected peaks.

4. The system as claimed in claim 2 wherein the processor is configured to process the detected gamma radiation spectrum in order to refine the selected peaks.

5. The system as claimed in claim 4 wherein the selected peaks are refined by fitting each of the selected peaks to a Gaussian curve.

6. The system as claimed in claim 5 the parameter values comprising the selected data points are comprised of the centroids of the Gaussian curves.

7. The system as claimed in claim 1 wherein the gamma radiation is detected from a plurality of gamma radiation sources, wherein each of the gamma radiation sources makes a contribution to the calibrated gamma radiation spectrum, and wherein the processor is configured to isolate the contribution of a gamma radiation source of interest in order to facilitate quantifying the gamma radiation source of interest.

8. The system as claimed in claim 1 wherein the gamma radiation is detected from a plurality of gamma radiation sources, wherein one of the gamma radiation sources is a gamma radiation source of interest, and wherein the processor is configured to quantify the gamma radiation source of interest.

9. The system as claimed in claim 8 wherein each of the gamma radiation sources makes a contribution to the calibrated gamma radiation spectrum and wherein quantifying the gamma radiation source of interest is comprised of deducting from the calibrated gamma radiation spectrum the contributions of the gamma radiation sources which are contributing significantly to the calibrated gamma radiation spectrum, other than the gamma radiation source of interest.

10. The system as claimed in claim 8 wherein the gamma radiation sources are comprised of at least one naturally occurring gamma radiation source and at least one introduced gamma radiation source, wherein each of the gamma radiation sources makes a contribution to the calibrated gamma radiation spectrum, and wherein quantifying the gamma radiation source of interest is comprised of deducting from the calibrated gamma radiation spectrum the contributions of the introduced gamma radiation sources.

11. The system as claimed in claim 10 wherein quantifying the gamma radiation source of interest is further comprised of deducting from the calibrated gamma radiation spectrum the contribution of at least one of the naturally occurring gamma radiation sources.

12. The system as claimed in claim 1, further comprising a temperature sensor for sensing a temperature of the gamma ray detector.

13. The system as claimed in claim 1 wherein the mathematical relationship is a linear relationship.

14. The system as claimed in claim 1 wherein the gamma ray detector and the analyzer are adapted to be lowered into a borehole.

15. The system as claimed in claim 14 wherein the gamma ray detector and the analyzer are configured to generate a plurality of the detected gamma radiation spectra.

16. The system as claimed in claim 15, further comprising a memory device for storing the detected gamma radiation spectra, wherein the memory device is adapted to be lowered into the borehole with the gamma ray detector and the analyzer.

17. The system as claimed in claim 16 wherein the processor is adapted to be connected with the memory device after the memory device has been retrieved from the borehole so that the processor can access the detected gamma radiation spectra.

18. The system as claimed in claim 17 wherein the processor is adapted to be located outside of the borehole.

19. A method of calibrating a detected gamma radiation spectrum generated from a plurality of detector output signals generated by a gamma ray detector, wherein each of the detector output signals represents a detected count of gamma radiation, wherein each of the detector output signals has a parameter value which is dependent upon the actual energy level of its associated detected count of gamma radiation, wherein the detector output signals are sorted into a plurality of channels according to their parameter values to generate the detected gamma radiation spectrum, and wherein the detected gamma radiation spectrum provides an indication of a frequency of the parameter values as a function of the parameter values, the method comprising:
  (a) selecting at least two data points from the detected gamma radiation spectrum, wherein each of the selected data points is comprised of a known actual energy level and its associated parameter value;
  (b) determining a mathematical relationship for the selected data points; and
  (c) adjusting the parameter values in the detected gamma radiation spectrum in accordance with the mathematical relationship, thereby generating a calibrated gamma radiation spectrum comprising adjusted parameter values.

20. The method as claimed in claim 19 wherein the gamma radiation is detected from at least one known gamma radiation source, wherein each of the known gamma radiation sources contributes a spectral signature to the detected gamma radiation spectrum, wherein the spectral signatures of each of the known gamma radiation sources are comprised of at least one peak, and wherein each of the selected data points is defined by a selected peak from the spectral signatures of the known gamma radiation sources.

21. The method as claimed in claim 20 wherein the parameter values comprising the selected data points are comprised of the centroids of the selected peaks.

22. The method as claimed in claim 21, further comprising repeating the method if a correlation between the known actual energy levels and the adjusted parameter values is below an acceptable level of correlation.

23. The method as claimed in claim 20, further comprising refining the selected peaks.

24. The method as claimed in claim 23 wherein refining the selected peaks is comprised of fitting each of the selected peaks to a Gaussian curve.

25. The method as claimed in claim 24 wherein the parameter values comprising the selected data points are comprised of the centroids of the Gaussian curves.

26. The method as claimed in claim 25, further comprising repeating the method if a correlation between the known actual energy levels and the adjusted parameter values is below an acceptable level of correlation.

27. The method as claimed in claim 19 wherein the gamma radiation is detected from a plurality of gamma radiation sources and wherein each of the gamma radiation sources makes a contribution to the calibrated gamma radiation spectrum, further comprising isolating the contribution of a gamma radiation source of interest in order to facilitate quantifying the gamma radiation source of interest.

28. The method as claimed in claim 19 wherein the gamma radiation is detected from a plurality of gamma radiation sources and wherein one of the gamma radiation sources is a gamma radiation source of interest, further comprising quantifying the gamma radiation source of interest.

29. The method as claimed in claim 28 wherein each of the gamma radiation sources makes a contribution to the calibrated gamma radiation spectrum and wherein quantifying the gamma radiation source of interest is comprised of deducting from the calibrated gamma radiation spectrum the contributions of the gamma radiation sources which are contributing significantly to the calibrated gamma radiation spectrum, other than the gamma radiation source of interest.

30. The method as claimed in claim 28 wherein the gamma radiation sources are comprised of at least one naturally occurring gamma radiation source and at least one introduced gamma radiation source, wherein each of the gamma radiation sources makes a contribution to the calibrated gamma radiation spectrum, and wherein quantifying the gamma radiation source of interest is comprised of deducting from the calibrated gamma radiation spectrum the contributions of the introduced gamma radiation sources.

31. The method as claimed in claim 30 wherein quantifying the gamma radiation source of interest is further comprised of deducting from the calibrated gamma radiation spectrum the contribution of at least one of the naturally occurring gamma radiation sources.

32. The method as claimed in claim 19 wherein the detector output signals are generated by a gamma ray detector and wherein the gamma ray detector is located in a borehole when the detector output signals are generated.

33. The method as claimed in claim 32 wherein the detected gamma radiation spectrum is generated by an analyzer and wherein the analyzer is located in the borehole when the detected gamma radiation spectrum is generated.

34. The method as claimed in claim 33 wherein the method is performed outside of the borehole.

35. The method as claimed in claim 19 wherein the detected gamma radiation spectrum is stored in a memory device.

36. The method as claimed in claim 35 wherein the memory device is located in a borehole when the detected gamma radiation spectrum is stored in the memory device.

37. The method as claimed in claim 36 wherein the method is performed outside of the borehole.

38. The method as claimed in claim 19, further comprising determining a first mathematical relationship for a first detected gamma radiation spectrum generated from detector output signals generated while the gamma ray detector was at a first temperature, determining a second mathematical relationship for a second detected gamma radiation spectrum generated from detector output signals generated while the gamma ray detector was at a second temperature, and determining a calibration/temperature relationship between the first mathematical relationship, the first temperature, the second mathematical relationship and the second temperature.

39. The method as claimed in claim 38, further comprising using the calibration/temperature relationship to derive a third mathematical relationship for a third detected gamma radiation spectrum generated from detector output signals generated while the gamma ray detector was at a third temperature.

40. The method as claimed in claim 39, further comprising determining the first temperature, the second temperature and the third temperature.

41. The method as claimed in claim 19 wherein the mathematical relationship is a linear relationship.

* * * * *